(12) United States Patent
Wood et al.

(10) Patent No.: US 9,024,182 B2
(45) Date of Patent: May 5, 2015

(54) UTILITY POWER-LINE-JUMPER APPARATUS WITH EXTERNAL VENTING

(71) Applicant: Utility Solutions, Inc., Hickory, NC (US)

(72) Inventors: Eugene H. Wood, Hickory, NC (US); Matthew Nolte, Hickory, NC (US)

(73) Assignee: Utility Solutions, Inc., Hickory, NC (US)

( * ) Notice: Subject to any disclaimer, the term of this patent is extended or adjusted under 35 U.S.C. 154(b) by 0 days.

(21) Appl. No.: 14/312,774

(22) Filed: Jun. 24, 2014

(65) Prior Publication Data

US 2014/0299346 A1  Oct. 9, 2014

Related U.S. Application Data

(63) Continuation of application No. 13/628,415, filed on Sep. 27, 2012, now Pat. No. 8,759,672.

(60) Provisional application No. 61/540,533, filed on Sep. 28, 2011.

(51) Int. Cl.
| | |
|---|---|
| *H02G 7/00* | (2006.01) |
| *H02G 1/02* | (2006.01) |
| *H01H 31/00* | (2006.01) |
| *H01H 33/16* | (2006.01) |
| *H01R 11/11* | (2006.01) |

(52) U.S. Cl.
CPC . *H02G 7/00* (2013.01); *H02G 1/02* (2013.01); *H01H 31/00* (2013.01); *H01H 31/006* (2013.01); *H01H 33/16* (2013.01); *H01R 11/11* (2013.01)

(58) Field of Classification Search
CPC .......... H02G 7/00; H02G 1/02; H01R 11/11; H01H 31/00; H01H 33/16
USPC ................................ 174/44, 45 R; 200/51 R
See application file for complete search history.

(56) References Cited

U.S. PATENT DOCUMENTS

| | | | | |
|---|---|---|---|---|
| 2,499,709 | A | * | 3/1950 | Whitman et al. ................ 174/44 |
| 4,645,888 | A | * | 2/1987 | Barkan et al. ............... 200/83 W |
| 4,661,662 | A | * | 4/1987 | Finke et al. .................. 200/48 R |
| 6,078,008 | A | | 6/2000 | Wood et al. |
| 6,167,673 | B1 | | 1/2001 | Fournier |
| 6,446,408 | B1 | | 9/2002 | Gordin et al. |
| 6,626,406 | B1 | | 9/2003 | Olson |
| 6,875,917 | B1 | | 4/2005 | Wood et al. |
| 8,759,672 | B2 | | 6/2014 | Wood et al. |

* cited by examiner

*Primary Examiner* — Dhirubhai R Patel
(74) *Attorney, Agent, or Firm* — Trego, Hines & Ladenheim, PLLC

(57) ABSTRACT

A line-jumper apparatus typically includes a first connector, a second connector, and a housing attached to the first connector and the second connector. In a closed position, the housing provides a low-resistance current path and a high-resistance current path between the first connector and the second connector. In an open position, the housing inhibits current from flowing between the first connector and the second connector. The housing is configured so that, when the housing is transitioned from the closed position to the open position, the low-resistance current path is opened before the high-resistance current path. The housing typically includes a safety mechanism that prevents the low-resistance current path from being opened unless the high-resistance current path is closed.

28 Claims, 33 Drawing Sheets

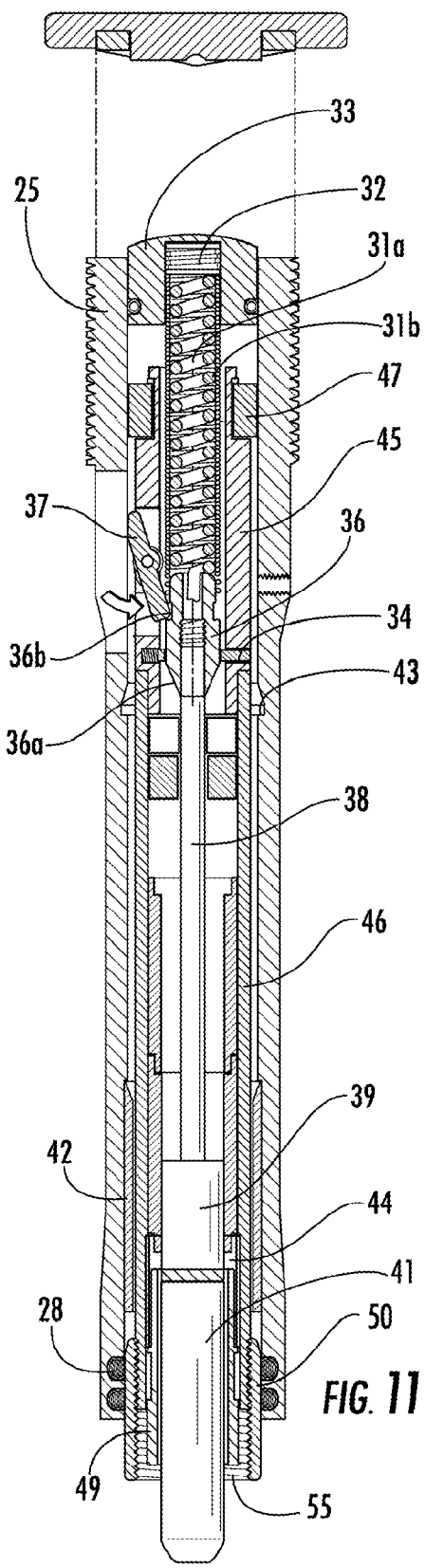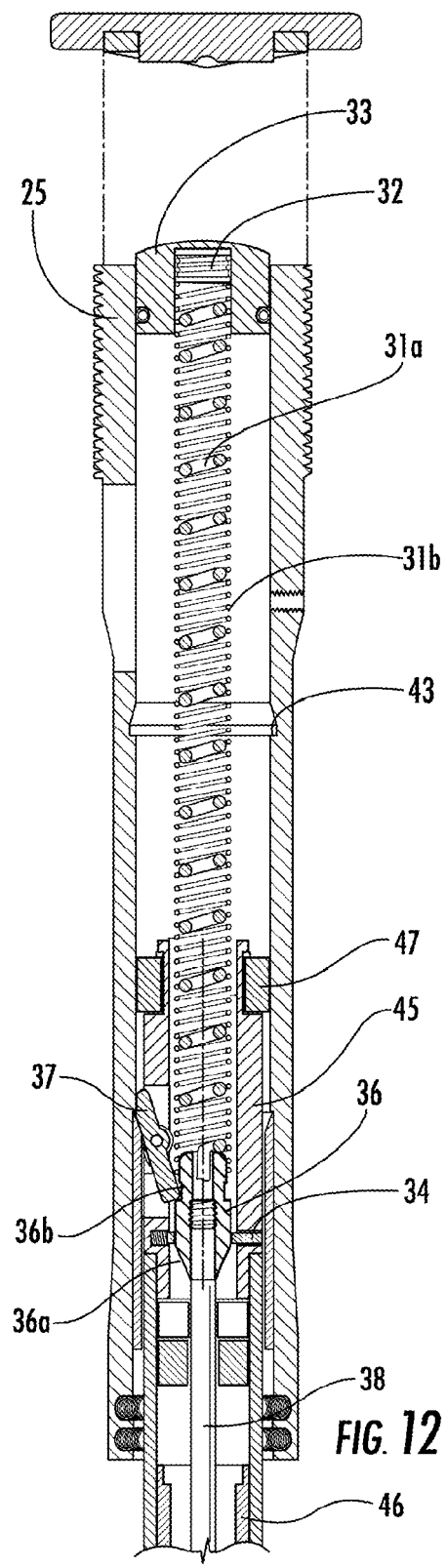

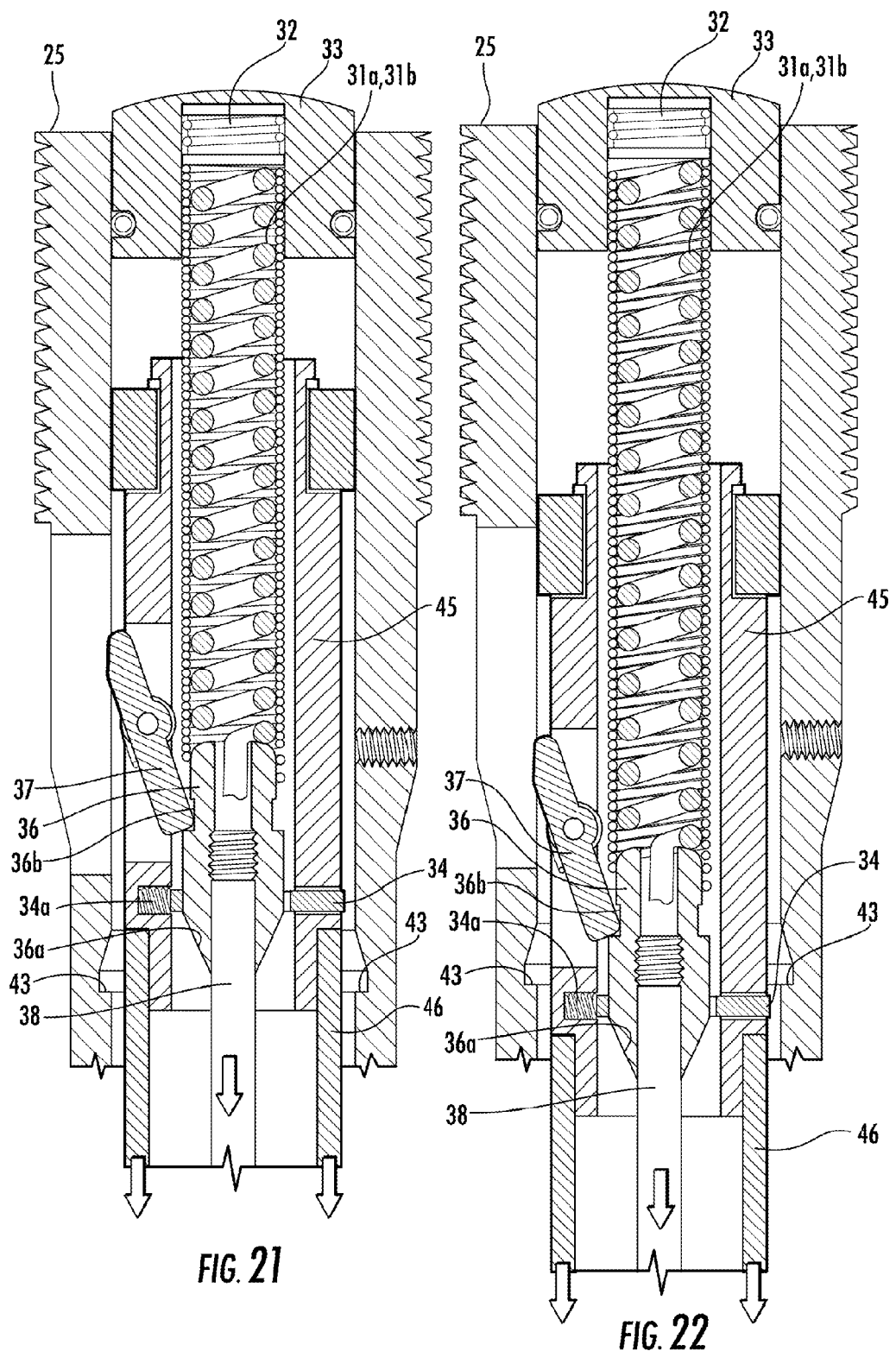

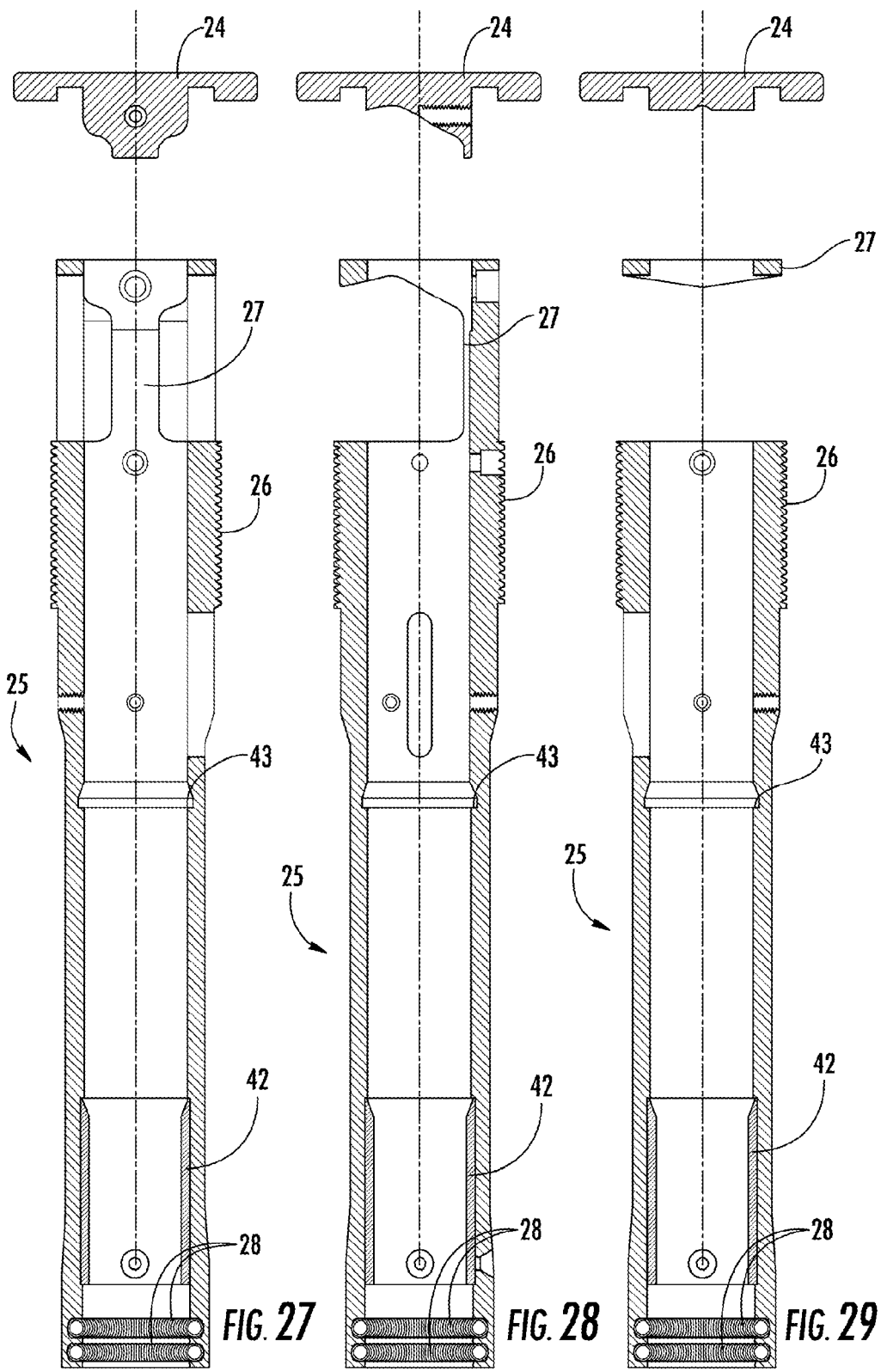

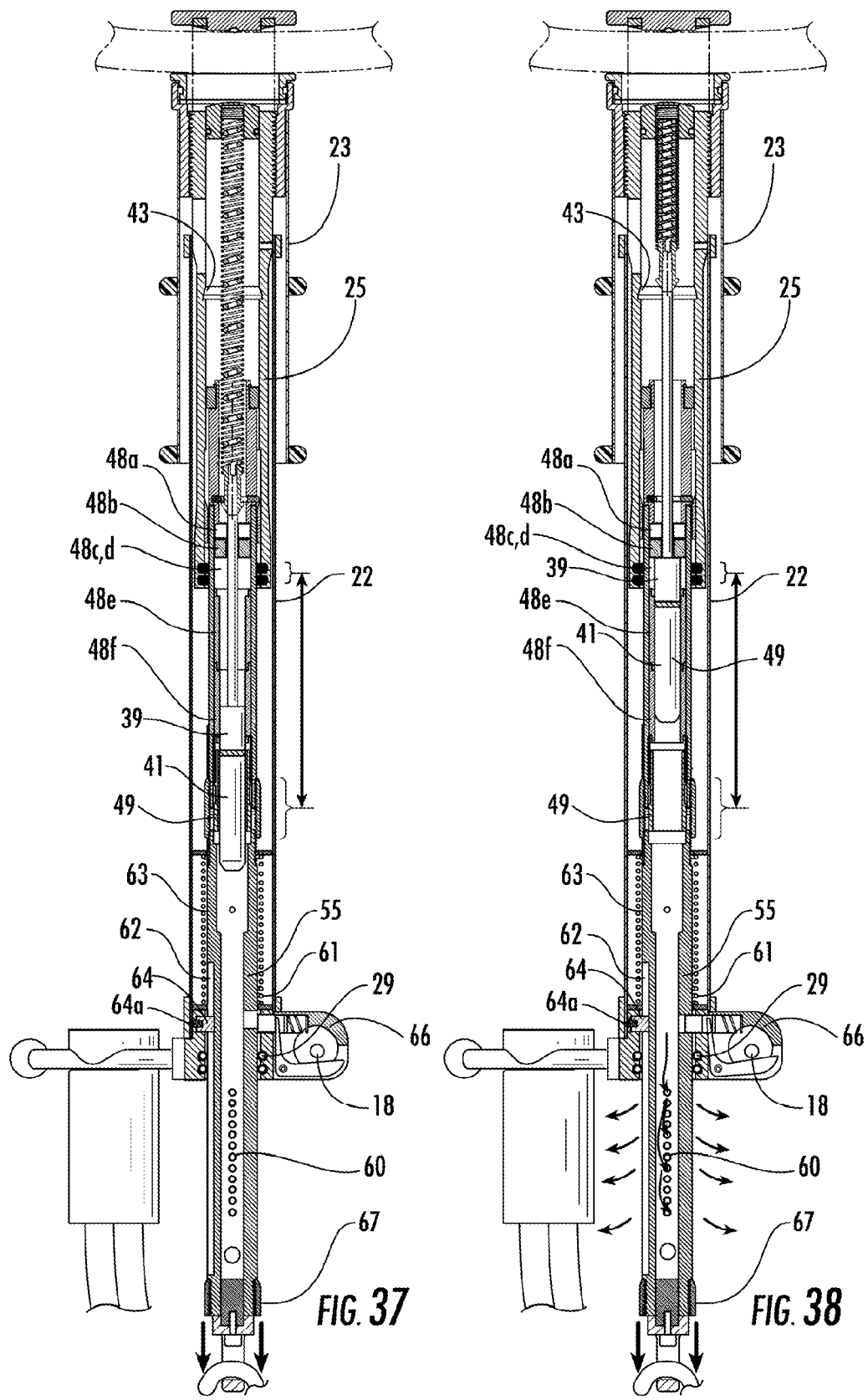

UTILITY POWER-LINE-JUMPER APPARATUS WITH EXTERNAL VENTING

CROSS-REFERENCE TO PRIORITY APPLICATION

This U.S. non-provisional patent application is a continuation of, incorporates entirely by reference, and claims the benefit of priority to Ser. No. 13/628,415 filed on Sep. 27, 2012, for a Utility Power Line Jumper Apparatus with External Venting, which has issued as U.S. Pat. No. 8,759,672. This U.S. non-provisional also incorporates entirely by reference and claims the benefit of priority to U.S. Patent Application Ser. No. 61/540,533 for a Utility Power Line Jumper Apparatus with External Venting (filed Sep. 28, 2011), which is hereby incorporated by reference in its entirety.

FIELD OF INVENTION

The present invention relates to the field of jumper equipment for the electric utility industry.

BACKGROUND

Power is primarily distributed to residential and commercial locations using overhead-power-line networks. These overhead-power-line networks require regular maintenance and repair to ensure proper operation. This maintenance and repair work on overhead power lines can be quite dangerous. For example, cutting live power cables can result in dangerous electric arcing.

Conventionally, an upstream switch must be opened before cutting any downstream portion of overhead power lines so that repairs or maintenance can be performed. Alternatively, devices have been developed for breaking and returning the load to overhead power lines without the need to open the upstream switch. An exemplary load-breaking and load-returning apparatus is disclosed in commonly assigned U.S. Pat. No. 6,078,008, which is hereby incorporated by reference in its entirety.

That said, a need exists for an improved load-breaking and load-returning apparatus.

SUMMARY

In one aspect, the present invention embraces a line-jumper apparatus. The line-jumper apparatus typically includes a first connector, a second connector, and a housing attached to the first connector and the second connector. In a closed position, the housing provides a low-resistance current path and a high-resistance current path between the first connector and the second connector. In an open position, the housing inhibits current from flowing between the first connector and the second connector. The housing is configured so that, when the housing is transitioned from the closed position to the open position, the low-resistance current path is opened before the high-resistance current path. The housing typically includes a safety mechanism that prevents the low-resistance current path from being opened unless the high-resistance current path is closed.

In a particular embodiment, the housing includes an outer housing, an inner housing, an intermediate assembly movably positioned within the housing, a retractable contact assembly movably positioned within the housing, and a safety key in communication with the intermediate assembly and the retractable contact assembly. When the housing is in the closed position, the low-resistance current path typically extends from the first connector to the inner housing, the inner housing to the intermediate assembly, and the intermediate assembly to the second connector. Furthermore, when the housing is in the closed position, the high-resistance current path extends from the first connector to the inner housing, the inner housing to the retractable contact assembly, the retractable contact assembly to the intermediate assembly, and the intermediate assembly to the second connector.

The intermediate assembly typically includes an engaging assembly (e.g., a toggle assembly or a key assembly), a non-conductive portion, and a venting structure having vents. The retractable contact assembly is typically engageable by the engaging assembly (e.g., with a toggle or a key). The housing is typically configured so that, when the engaging assembly is engaged with the retractable contact assembly, the intermediate assembly remains in electrical communication with the retractable contact assembly in a way that the high-resistance current path remains closed. The safety key is typically configured to prevent the intermediate assembly from moving within the housing in a way that would allow the low-resistance current path to open unless the engaging assembly is engaged with the retractable contact assembly.

When the housing is transitioned from the closed position to the open position, the engaging assembly typically engages then releases the retractable contact assembly. The engaging assembly typically releases the retractable contact assembly after the low-resistance current path has opened. Upon being released by the engaging assembly, the retractable contact assembly typically automatically retracts within the housing so that the intermediate assembly is not in electrical communication with a conductive portion of the retractable contact assembly.

In another embodiment, the line-jumper apparatus typically includes a first connector, a second connector, and a housing attached to the first connector and the second connector. The housing typically defines a primary axis between the first connector and the second connector. In a closed position, the housing provides a low-resistance current path and a high resistance current path between the first connector and the second connector. In an open position, the housing inhibits current from flowing between the first connector and the second connector. The housing is configured is that, when the housing is transitioned from the closed position to the open position, the low-resistance current path is opened before the high resistance current path. The housing typically includes a venting structure having vents for allowing gases to escape the housing. When the housing is in the open position, the vents are configured to (i) extend out of the housing and (ii) release hot gases that occur during electric arcing primarily in one or more directions substantially perpendicular to the primary axis.

In yet another embodiment, the line-jumper apparatus typically includes a first connector, a second connector, and a housing attached to the first connector and the second connector. The second connector typically defines a cavity therethrough and includes an internal pin connector that protrudes into the cavity. In a closed position, the housing provides a low-resistance current path and a high resistance current path between the first connector and the second connector. In an open position, the housing inhibits current from flowing between the first connector and the second connector. The housing is configured is that, when the housing is transitioned from the closed position to the open position, the low-resistance current path is opened before the high resistance current path. The housing typically includes a venting structure configured to (i) slidably engage the second connector's cavity and (ii) at least partially extend out of the second connector when the housing is in the open position. The venting structure typically includes (i) vents for allowing gases to escape the housing in the open position and (ii) a guide rail. The internal pin connector, when the housing is transitioned from the closed position to the open position, is configured to slidably engage the guide rail to (i) prevent the rotation of the venting structure and (ii) maintain an electrical connection between the housing and the second connector.

The foregoing illustrative summary, as well as other exemplary objectives and/or advantages of the invention, and the manner in which the same are accomplished, are further explained within the following detailed description and its accompanying drawings.

BRIEF DESCRIPTION OF THE DRAWINGS

FIG. 11 schematically depicts a cross-sectional view of an exemplary inner housing with a retractable contact assembly being retracted.

FIG. 12 schematically depicts a cross-sectional view of an exemplary inner housing with a retractable contact assembly being extended.

FIGS. 19-22 schematically depict a toggle engaging an exemplary fixture to effect the extension of a retractable contact assembly.

FIGS. 27-29 depict different cross-sectional views of an exemplary inner housing.

FIGS. 36-38 schematically depict an exemplary line-jumper apparatus in which the toggle has been eliminated.

DETAILED DESCRIPTION

In one aspect, the present invention embraces a portable apparatus for breaking and returning a load to a portion of a power line.

Figure 1:
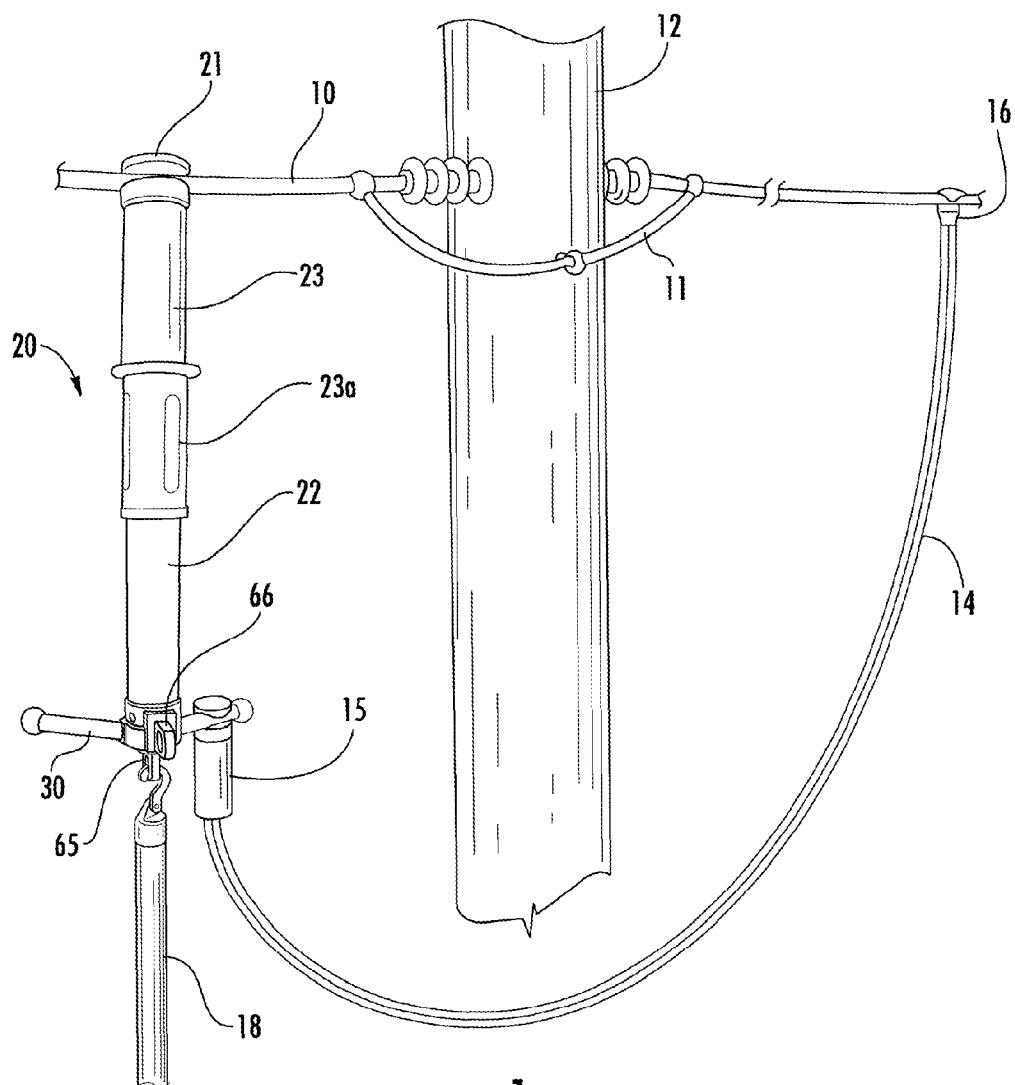
FIG. 1 schematically depicts a perspective view of an exemplary line-jumper apparatus in a closed position.

In this regard, FIGS. 1-6 depict a line-jumper apparatus 20 in accordance with the present invention. The line-jumper apparatus 20 typically includes a first connector 21 and a second connector 30 (e.g., a dual-conductor bar connector), which are formed from one or more conductive materials. As depicted in FIG. 1, the first connector 21 may be connected to a power line 10. As also depicted in FIG. 1, a jumper cable 14 may be connected to the second connector 30 (e.g., with a first jumper-cable connector 15) and to the power line 10 (e.g., with a second jumper-cable connector 16).

The line-jumper apparatus 20 typically includes a lower outer housing 22 and an upper outer housing 23. The upper outer housing 23 typically includes a handle 23a. The exterior of the lower outer housing 22 and the exterior of the upper outer housing 23 are typically formed from one or more insulating (i.e., substantially non-conductive) materials, such as fiberglass.

Figure 2:
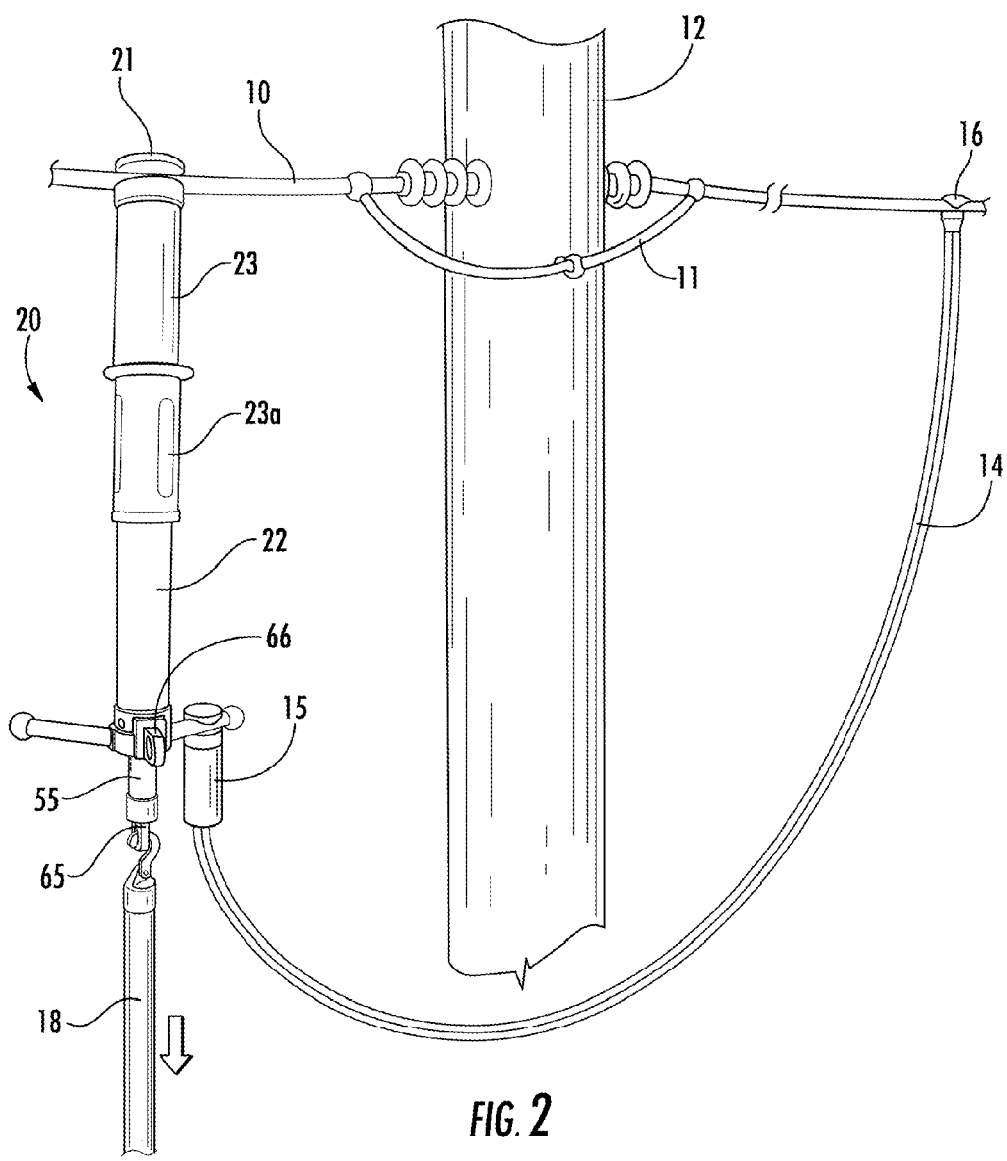
FIG. 2 schematically depicts a perspective view of an exemplary line-jumper apparatus being transitioned from a closed position to an open position.
Figure 3:
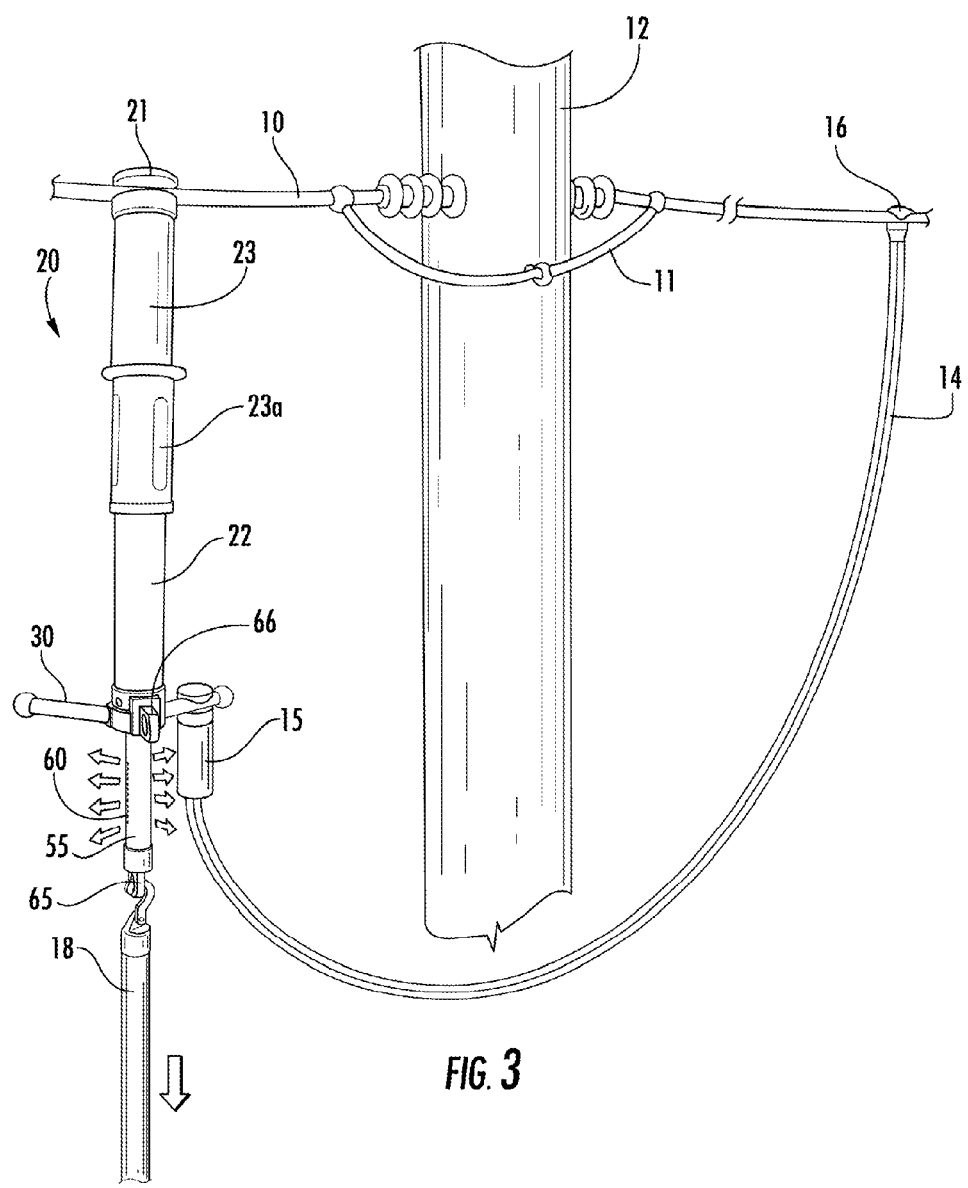
FIG. 3 schematically depicts a perspective view of an exemplary line-jumper apparatus in an open position.

The line-jumper apparatus 20 typically includes an engaging ring 65 and a reset trigger 66, which enable the line-jumper apparatus 20 to be transitioned between a closed position and an open position. FIGS. 1-3 depict the line-jumper apparatus being transitioned between a closed position and an open position, in which FIG. 1 depicts the closed position, FIG. 2 depicts an intermediate position, and FIG. 3 depicts the open position. In the closed position, the line-jumper apparatus 20 provides a closed circuit between the first connector 21 and the second connector 30 (e.g., to connect the power line 10 to the jumper cable 14 through the line-jumper apparatus 20). In the open position, line-jumper apparatus 20 provides an open circuit (i.e., does not conduct electricity).

Figure 4:
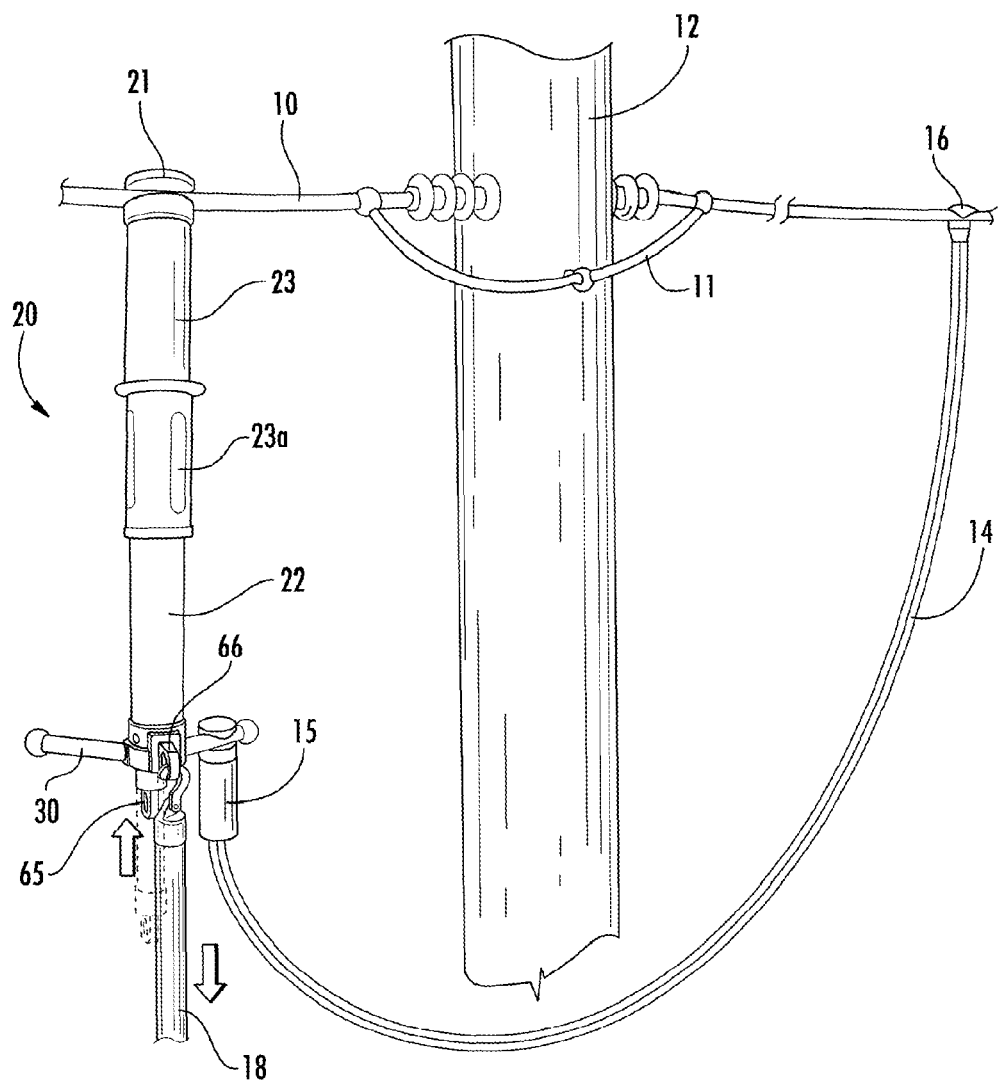
FIG. 4 schematically depicts a perspective view of an exemplary line-jumper apparatus being transitioned from an open position to a closed position.
Figure 5:
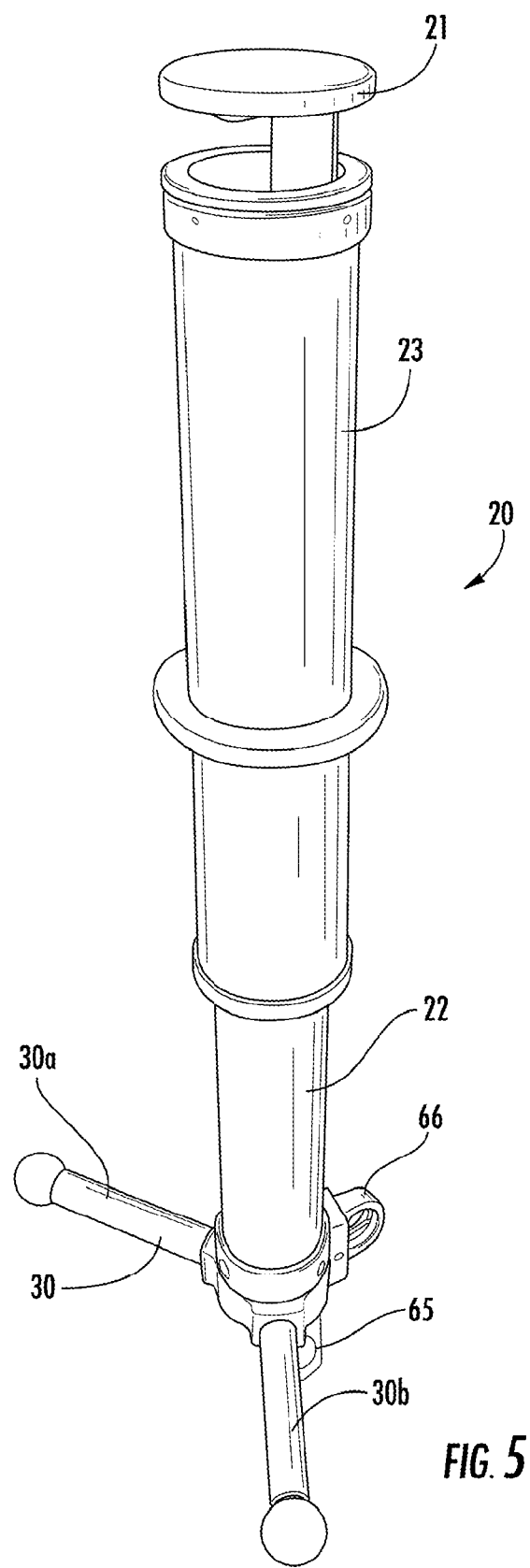
FIG. 5 schematically depicts a perspective view of an exemplary line-jumper apparatus.
Figure 6:
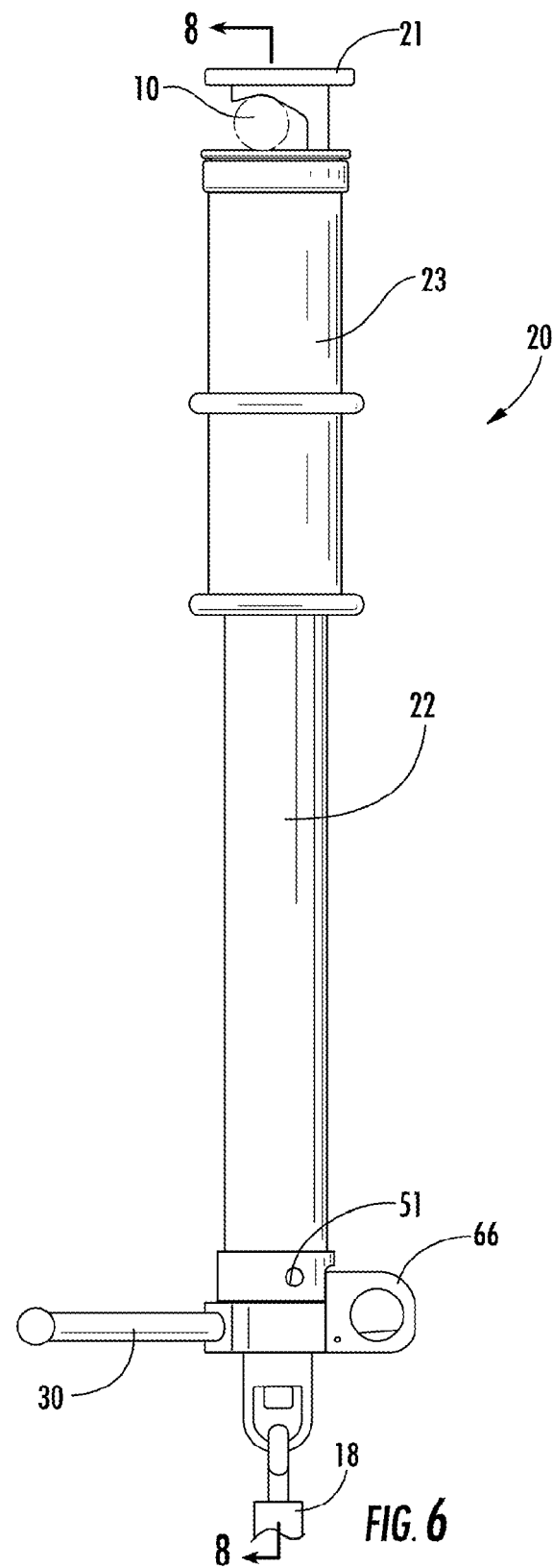
FIG. 6 schematically depicts a side view of an exemplary line-jumper apparatus.
Figure 7:
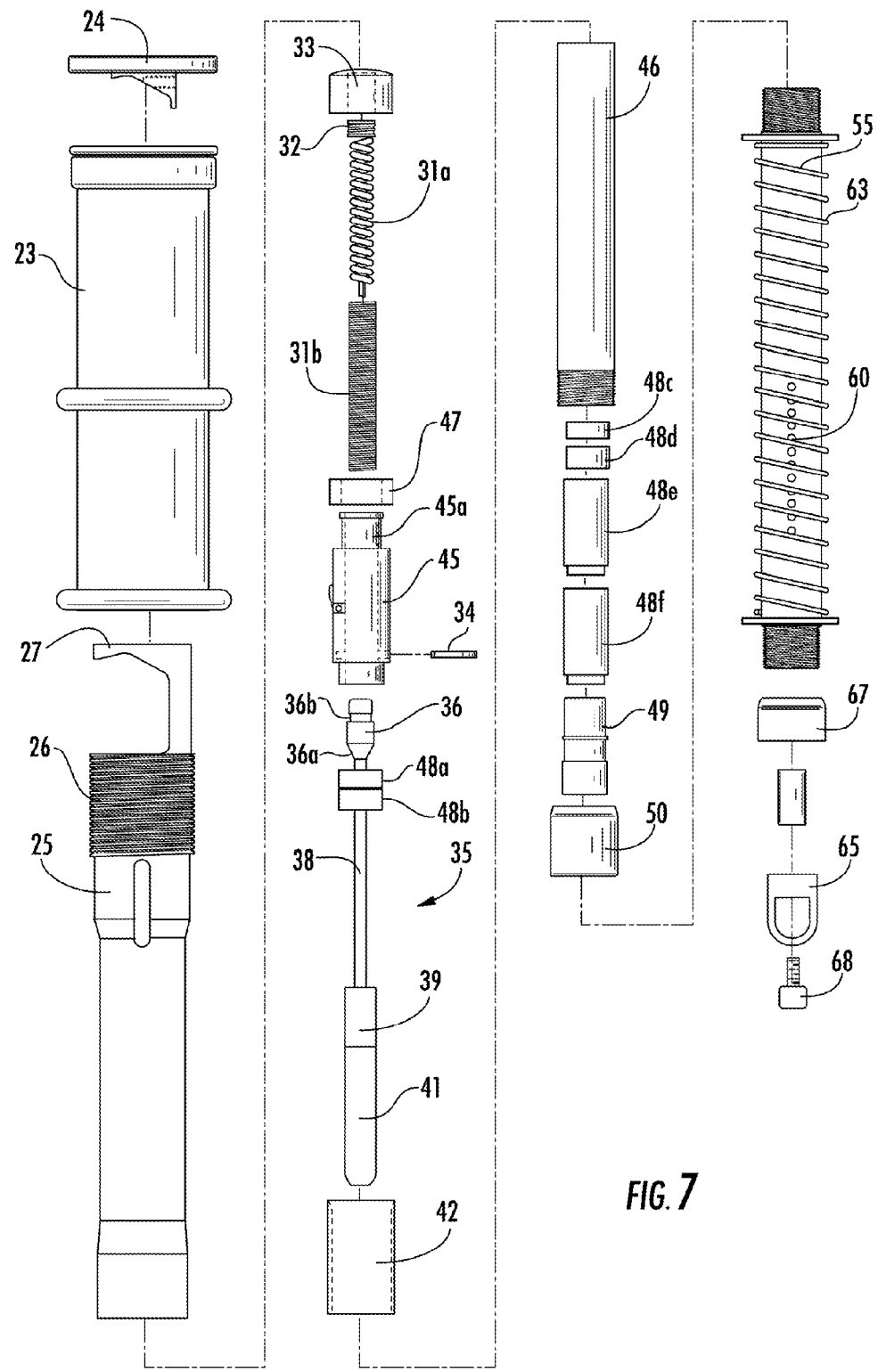
FIG. 7 schematically depicts an exploded view of internal components of an exemplary line-jumper apparatus.

As depicted in FIGS. 1-3, a hot stick or hook 18 may be used to pull down on the engaging ring 65 and thereby transition the line-jumper apparatus 20 from the closed position to the open position. In the open position, a venting structure 55 having vents 60 is typically exposed. The venting structure 55 enables hot gases to escape from the line-jumper apparatus 20. These hot gases are typically caused by electric arcing when the line-jumper apparatus 20 transitions between a closed circuit and an open circuit. As depicted in FIG. 4, a hot stick or hook 18 may engage the reset trigger 66 to transition the line-jumper apparatus 20 from the open position to the closed position.

To facilitate the transition between the closed position and the open position, the line-jumper apparatus 20 typically includes a low-resistance current path and a high-resistance current path. In the closed position, both the low-resistance current path and the high-resistance current path are typically closed, whereas, in the open position, both the low-resistance current path and the high-resistance current path are open. During the transition between the closed position and the open position, the low-resistance current path will typically open before the high-resistance current path.

FIGS. 7-10 depict a cross-sectional view of the interior of the line-jumper apparatus 20.

As depicted in FIGS. 7-10, the line-jumper apparatus 20 typically includes an inner housing 25 that is connected to the upper outer housing 23 via threads 26 on the exterior of the inner housing 25. In addition to FIGS. 7-10, FIGS. 27-29 depict different cross-sectional views of the inner housing 25. The inner housing 25 is typically connected to the lower outer housing 22 (e.g., with one or more screws). A connector cap 24 is typically attached to a hook portion 27 of the inner housing 25 to form the first connector 21. As depicted in FIGS. 27-29, the interior of the inner housing 25 typically includes an inner groove 43. The bottom portion of the interior of the inner housing 25 typically includes one or more inner-housing contact rings 28. The inner-housing contact rings 28 are typically formed from one or more canted coil springs. The inner housing 25 and the inner-housing contact rings 28 are typically formed from one or more conductive materials.

The line-jumper apparatus 20 typically includes an intermediate assembly 40 that is movably positioned within the outer housing (e.g., the lower outer housing 22 and the upper outer housing 23). At least a portion of the intermediate assembly 40 is also typically movably positioned within the inner housing 25.

The intermediate assembly 40 typically includes a toggle assembly 45 (e.g., an engaging assembly) that is connected to an insulating portion 46 (i.e., a nonconductive portion). The toggle assembly 45 includes a key 34 and a toggle 37. A plug 47 typically surrounds an extended portion 45a of the toggle assembly 45. The plug 47 typically provides a tight fit for the intermediate assembly 40 within the interior of the inner housing 25. A plurality of plugs 48a-48f are typically positioned within the interior of the insulating portion 46. The insulating portion 46, the plug 47, and the plugs 48a-48f are typically formed from one or more insulating materials. Moreover, the plugs 48e and 48f are typically formed of one or more arc-extinguishing materials (e.g., an ablative material).

An interior contact 49 is typically positioned within the insulating portion 46. At least a portion of the interior contact 49 typically protrudes from the lower portion of the insulating portion 46 and is in contact with the venting structure 55. An intermediate contact 50 connects the insulating portion 46 to the venting structure 55 (e.g., via threads). The intermediate contact 50 and the interior contact 49 are formed from one or more conductive materials.

Figure 8:
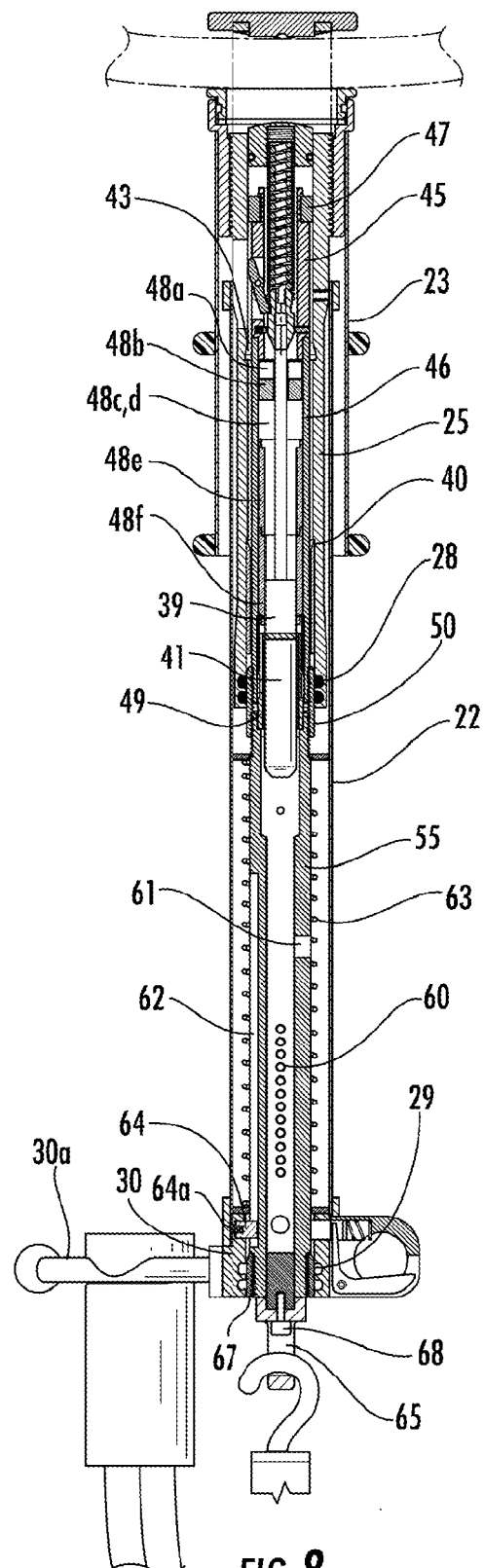
FIG. 8 schematically depicts a cross-sectional view of an exemplary line-jumper apparatus.
Figure 9:
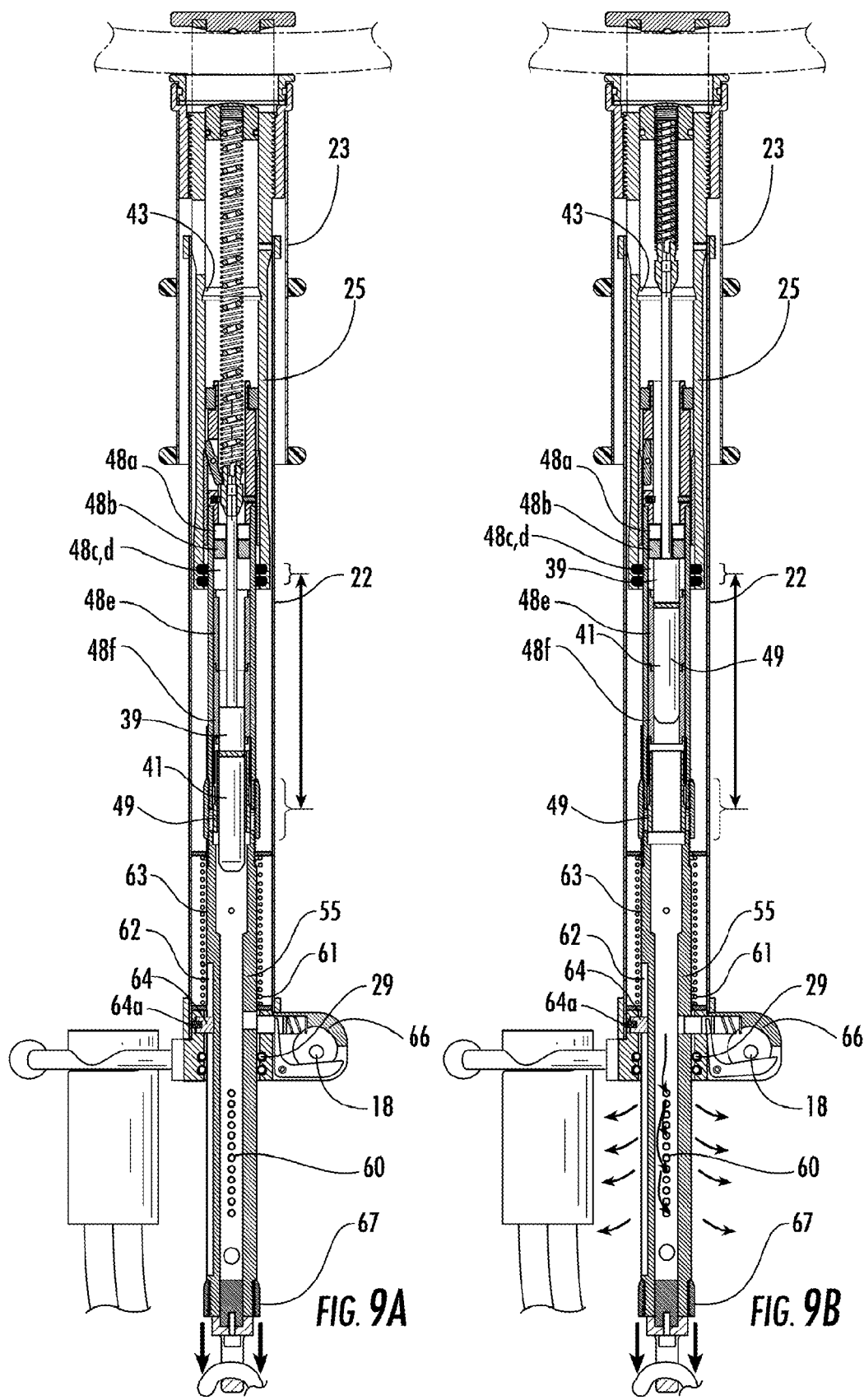
FIG. 9A schematically depicts a cross-sectional view of an exemplary line-jumper apparatus immediately before the high-resistance current path opens.
FIG. 9B schematically depicts a cross-sectional view of an exemplary line-jumper apparatus after the high-resistance current path opens.
Figure 10:
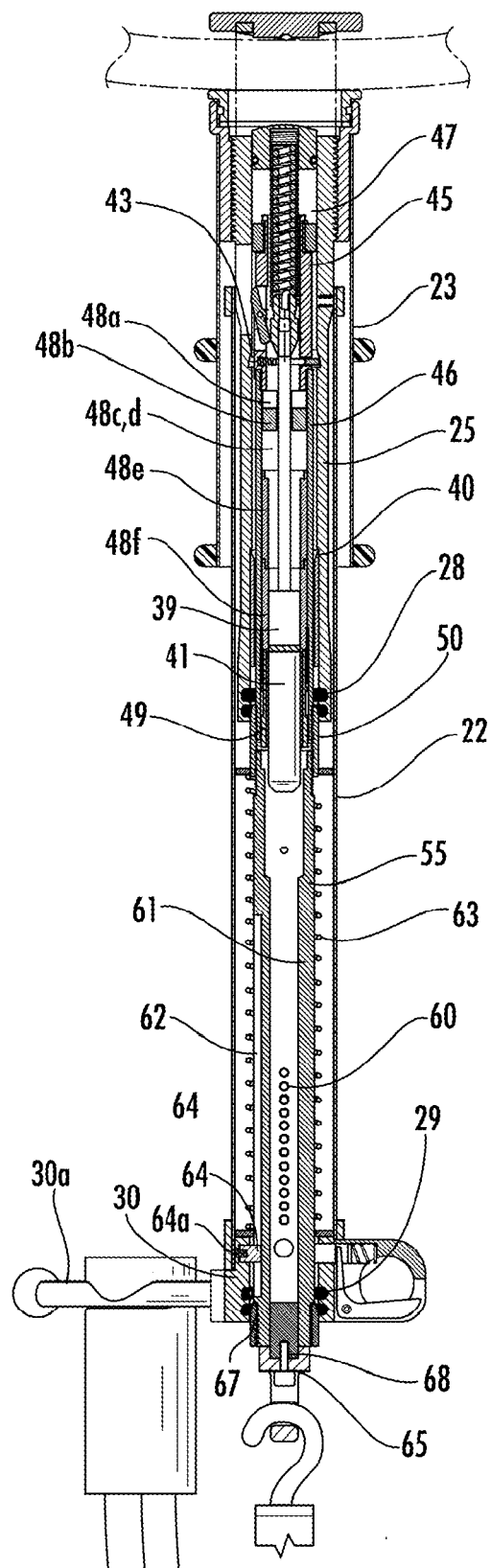
FIG. 10 schematically depicts another cross-sectional view of an exemplary line-jumper apparatus.
Figure 13:
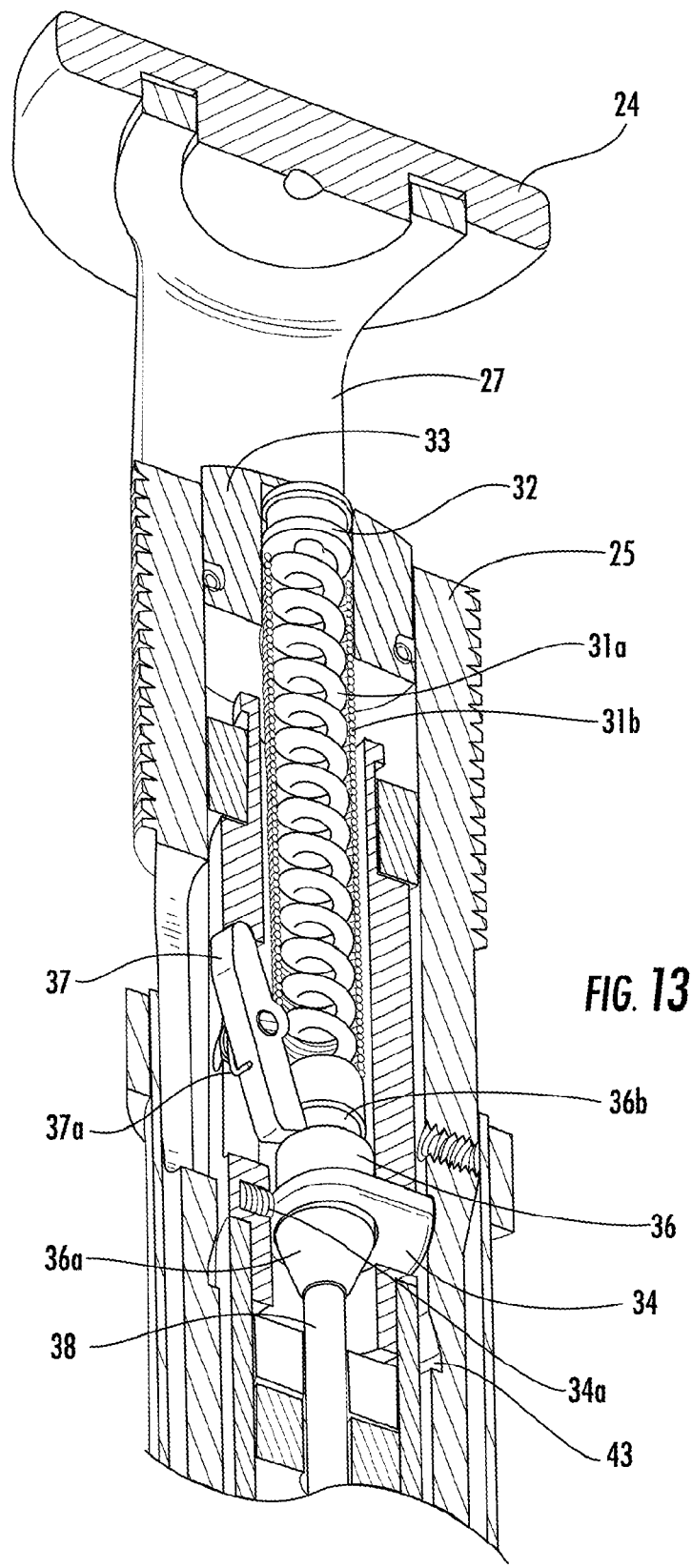
FIG. 13 schematically depicts a cutaway perspective view of the fixture of an exemplary retractable contact assembly being engaged by a toggle.
Figure 14:
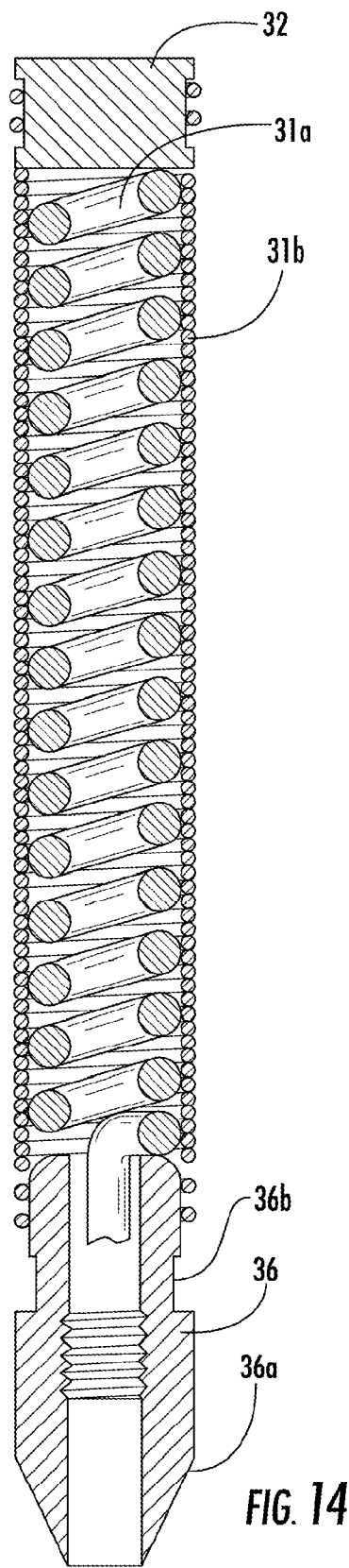
FIG. 14 schematically depicts a cross-sectional view of an exemplary fixture being attached to two springs.
Figure 30:
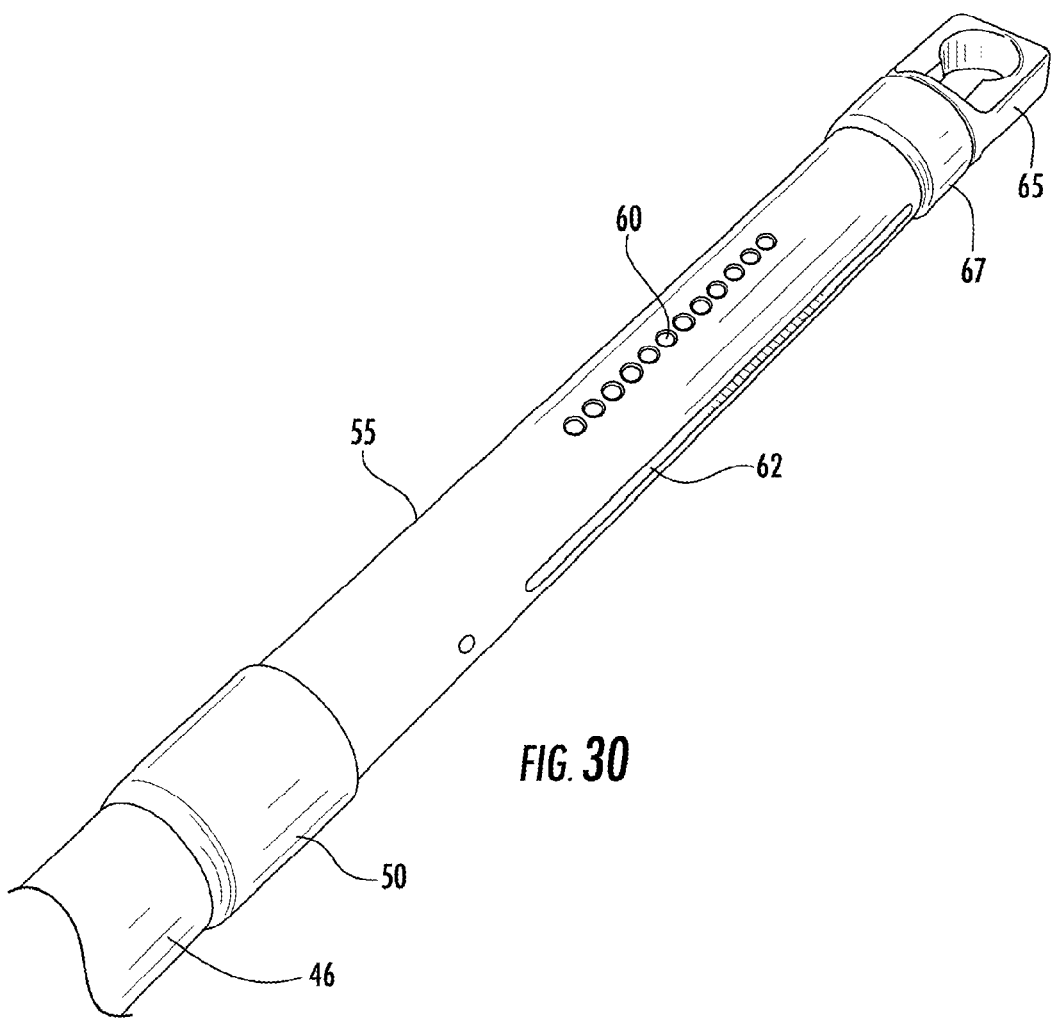
FIG. 30 depicts a perspective view of an exemplary venting structure.
Figure 31:
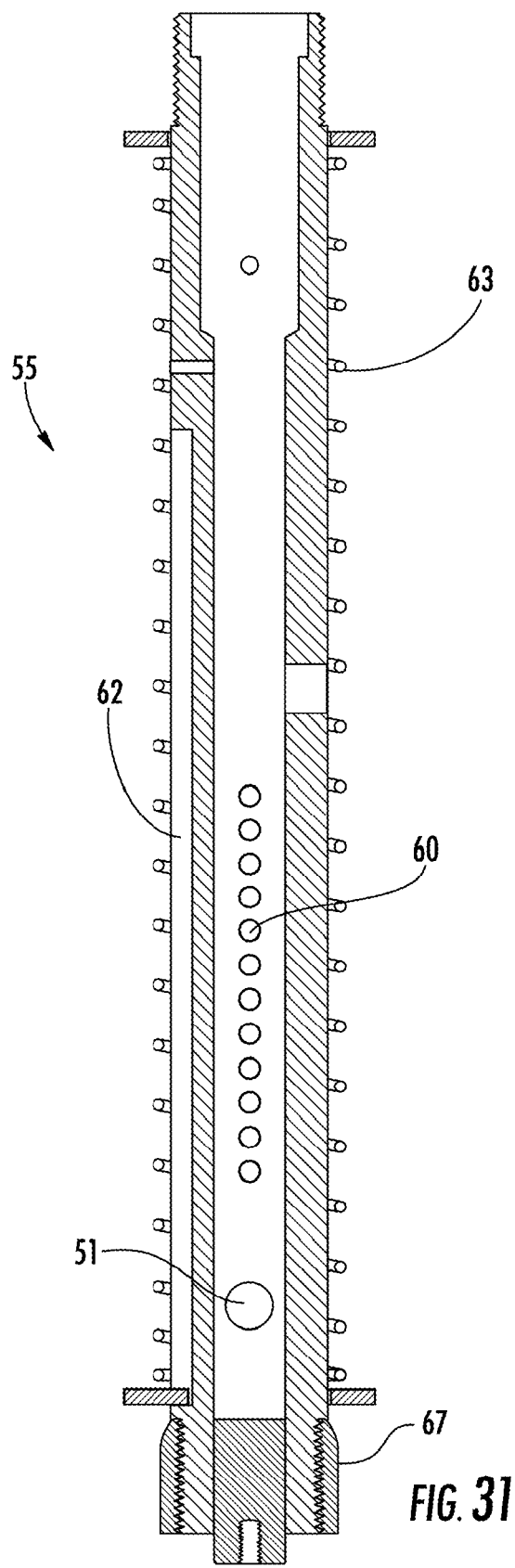
FIG. 31 schematically depicts a cross-sectional view of an exemplary venting structure.

As depicted in FIGS. 8-10, the venting structure 55 typically includes vents 60, a locking structure 61, and a guide rail 62. The venting structure 55 is also depicted in FIGS. 30-31. The vents 60 are typically positioned on the venting structure 55 so that they are exposed in the open position. As depicted in FIG. 3 and in FIG. 9B, the vents 60 typically enable hot gases to primarily escape from the line-jumper apparatus 20 in one or more substantially perpendicular directions relative to the primary axis of the line-jumper apparatus 20 (i.e., the axis running from the first connector 21 to the second connector 30 along which the intermediate assembly 40 slides). A reset spring 63 is typically positioned around the venting structure 55. As depicted in FIGS. 9A-9B, the reset spring 63 is typically compressed as the line-jumper apparatus 20 is transitioned from the closed position to the open position. The force provided by the reset spring 63 when it is compressed enables the line-jumper apparatus 20 to be automatically returned to the closed position (e.g., upon the reset trigger being engaged). The engaging ring 65 and a bottom contact 67 are typically positioned at the bottom of the venting structure 55. In this regard, the bottom contact 67 is typically secured via threads, and the engaging ring 65 is typically held in place with a securing pin 68. The venting structure 55, reset spring 63, and bottom contact 67 are typically formed from one or more conductive materials.

The second connector 30 surrounds a portion of the venting structure 55 (e.g., by defining a cavity) and is typically connected to the bottom of the lower outer housing 22. The second connector 30 typically includes one or more bottom contact rings 29. The bottom contact rings 29 are typically formed from one or more canted coil springs.

The second connector 30 also typically includes a pin 64 (e.g., a pin contact) that is slidably engaged with the guide rail 62. A spring 64a typically helps to ensure that the pin 64 remains slidably engaged with the guide rail 62. By remaining engaged with the guide rail 62, the pin 64 (i) ensures that an electrical connection is maintained between the second connector 30 and the venting structure 55 and (ii) prevents the venting structure 55 from rotating relative to the second connector 30.

Finally, the second connector 30 typically includes two conductor bars 30a and 30b. The second connector 30, including the conductor bars 30a, 30b, the bottom contact rings 29, and the pin 64, is typically formed from one or more conductive materials.

Because the inner-housing contact rings 28 and the bottom contact rings 29 are typically formed from canted coil springs, the inner-housing contact rings 28 and the bottom contact rings 29 typically have low surface friction. Therefore, the reset spring 63 can have a relatively low spring constant (i.e., spring rate). In this regard, the reset spring 63 typically has a spring constant of less than about 1.0 pound per inch of compression, more typically less than about 0.65 pound per inch of compression.

The reset trigger 66 is typically connected to the second connector 30. When the line-jumper apparatus 20 is in the open position, the reset trigger 66 engages the locking structure 61 to lock the line-jumper apparatus 20 into the open position. When the reset trigger 66 is disengaged, the line-jumper apparatus 20 can be returned (e.g., automatically returned) to the closed position.

Figure 32:
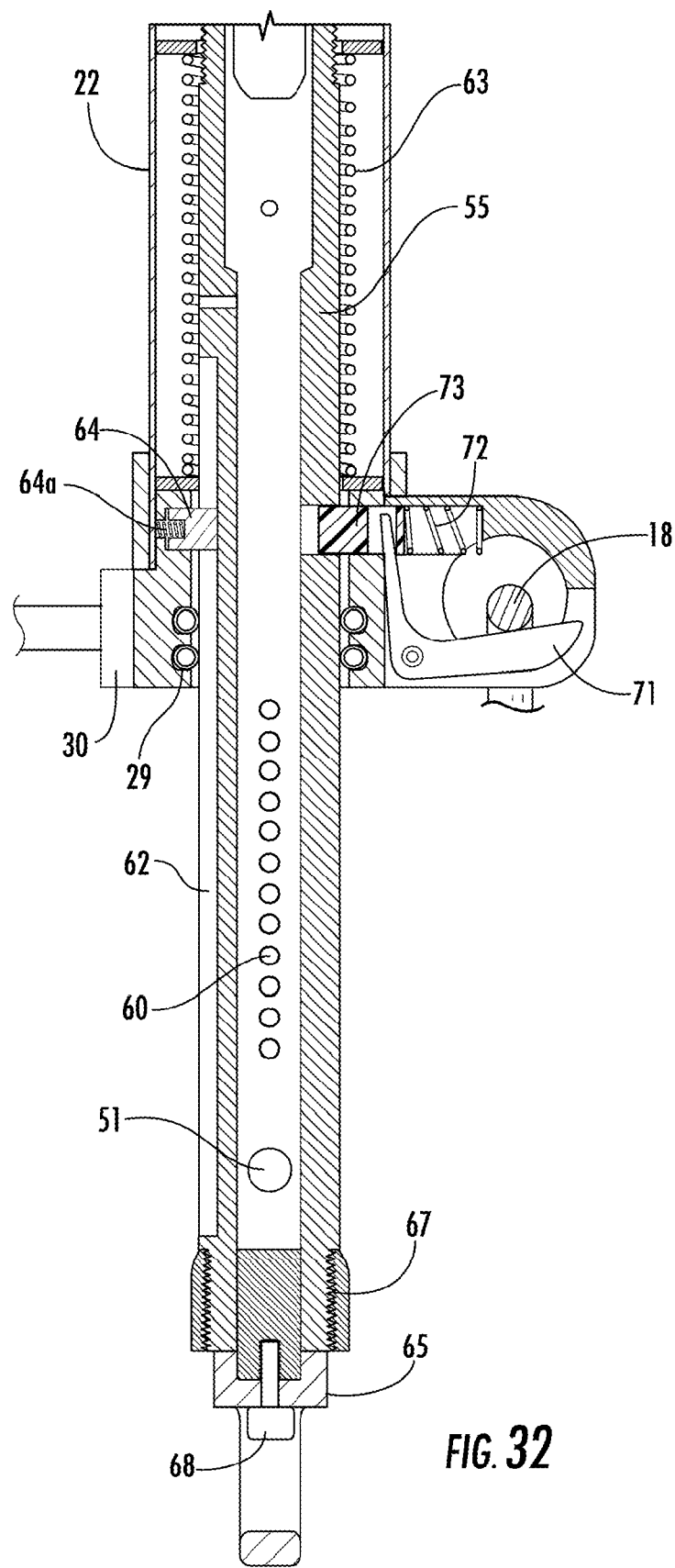
FIGS. 32-34 schematically depict a partial cross-sectional view showing the operation of an exemplary reset trigger.
Figure 33:
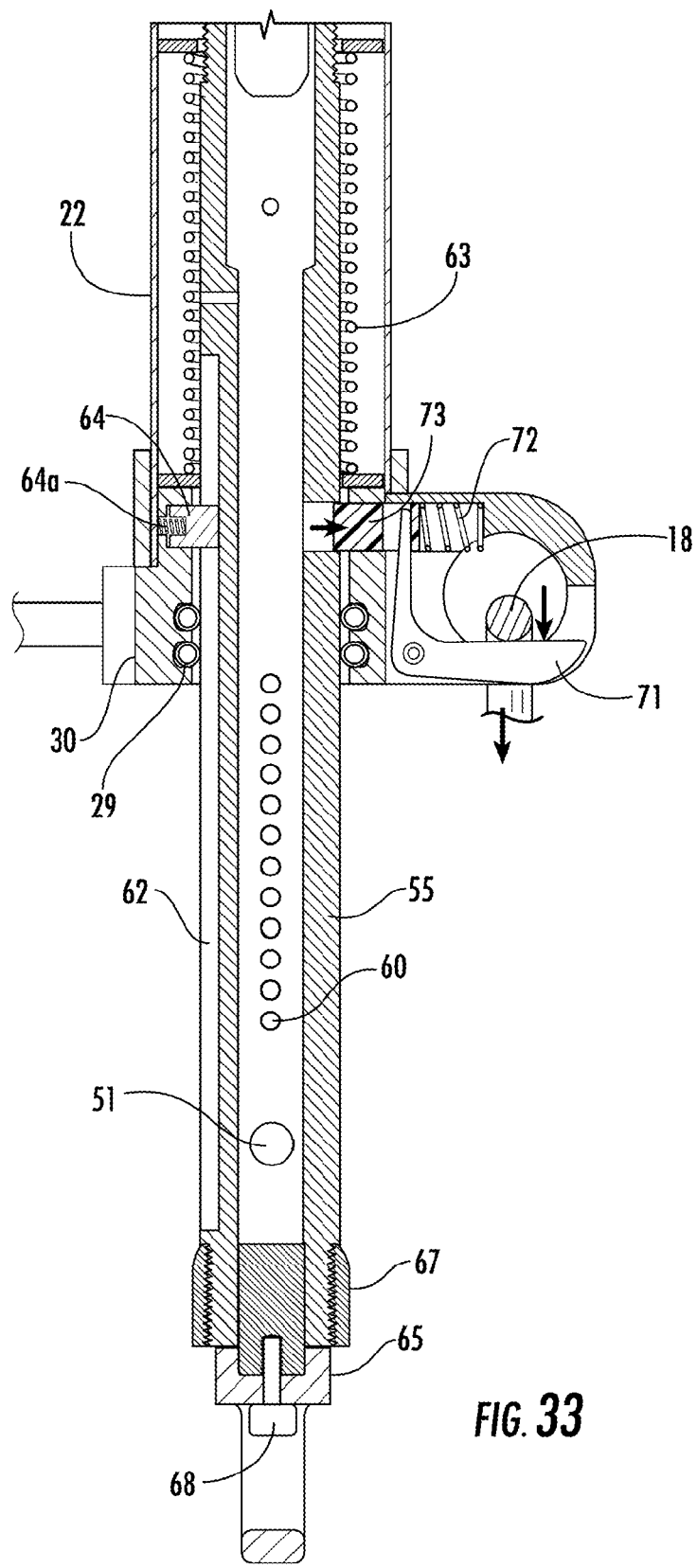
Figure 34:
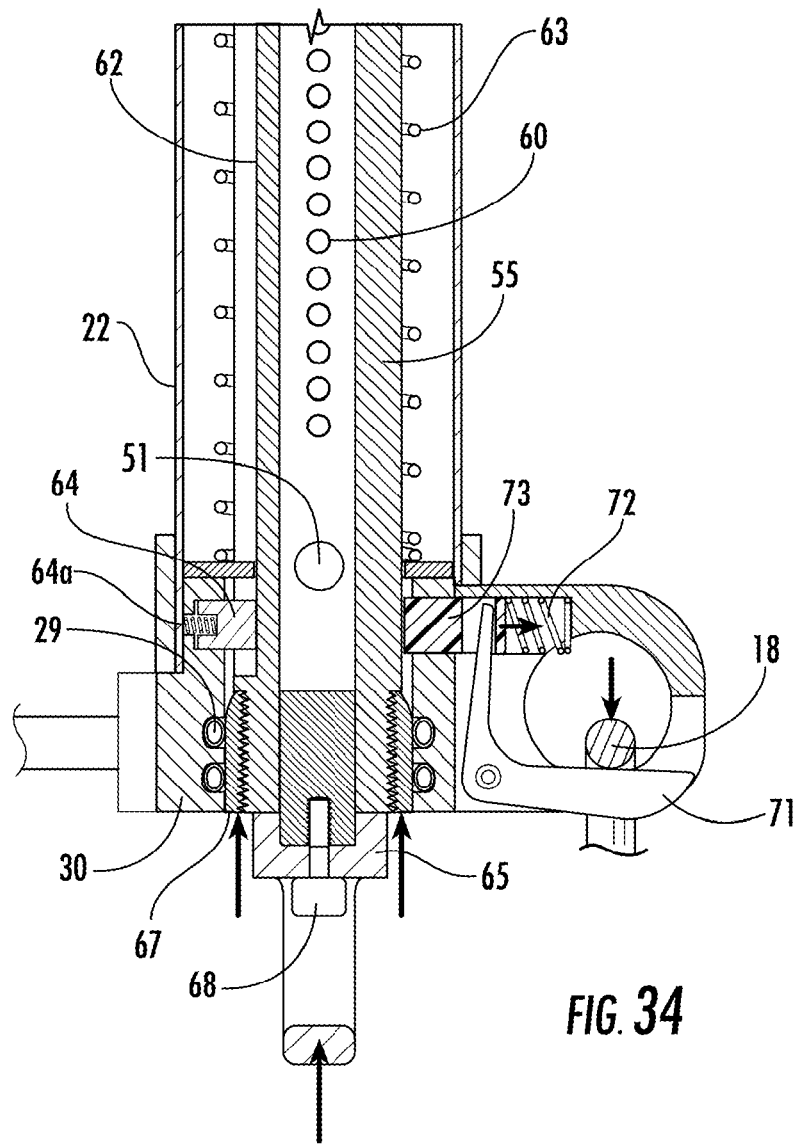

In this regard and as depicted in FIGS. 32-34, the reset trigger 66 typically includes a lever 71, a trigger spring 72, and a trigger plug 73. As depicted in FIG. 32, when the venting structure 55 is sufficiently extended from the line-jumper apparatus 20, the trigger spring 72 pushes the trigger plug 73 into the locking structure 61 (e.g., a hole in the venting structure 55), thereby locking the line-jumper apparatus 20 into the open position. As depicted in FIGS. 33-34, to disengage the reset trigger 66, the lever 71 is depressed (e.g., with a hook 18), which retracts the trigger plug 73, thereby enabling the venting structure 55 to be retracted and the line-jumper apparatus 20 to be returned to the closed position.

Figure 35:
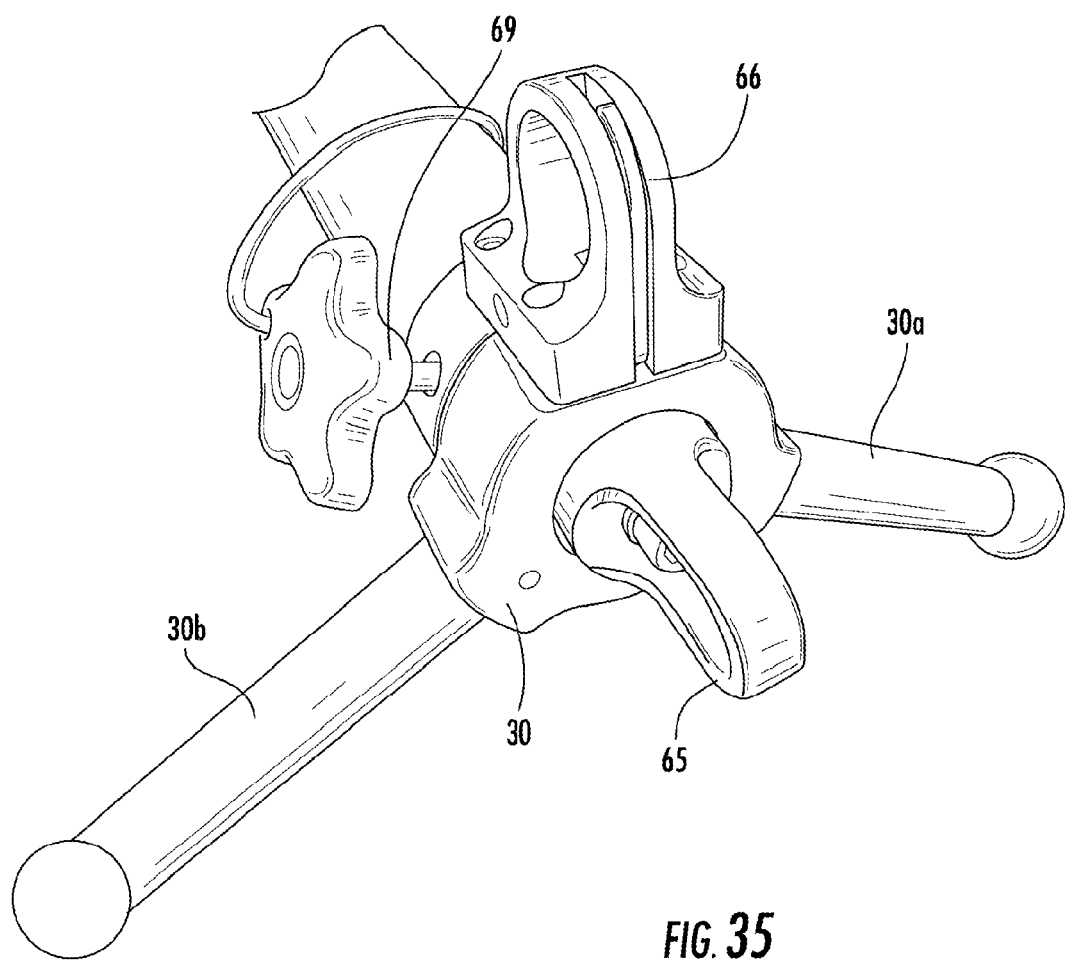
FIG. 35 schematically depicts a perspective view of the bottom of an exemplary line-jumper apparatus.

As depicted in FIG. 35, the line-jumper apparatus 20 typically includes a safety locking pin 69 for locking the line-jumper apparatus 20 in the closed position. Accordingly, the line-jumper apparatus 20 typically includes a safety-locking-pin hole 51. As depicted in FIG. 10, the safety-locking-pin hole 51 typically extends through the lower outer housing 22, the second connector 30, and the venting structure 55. When the safety locking pin 69 engages the safety-locking-pin hole 51, the venting structure 55 is prevented from being extended from the bottom of the line-jumper apparatus 20.

As noted above, in the closed position, the line-jumper apparatus 20 provides a closed low-resistance current path from the first connector 21 to the second connector 30. In this regard, the low-resistance current path typically flows from the first connector 21 through the inner housing 25 to the inner-housing contact rings 28, from the inner-housing contact rings 28 to the intermediate contact 50, from the intermediate contact 50 through the venting structure 55 to the bottom contact 67, and, finally, from the bottom contact 67 through the bottom contact rings 29 to the second connector 30. During the transition from the closed position to the open position, the low-resistance current path is typically broken once the intermediate contact 50 no longer forms an electrical connection with the inner-housing contact rings 28.

As the line-jumper apparatus 20 is transitioned from the closed position to the open position, the intermediate contact 50 moves downward relative to the inner-housing contact rings 28. Once the intermediate contact 50 has moved sufficiently so as to no longer form an electrical connection with the inner-housing contact rings 28 (e.g., as depicted in FIG. 9A), the low-resistance current path is broken. The low-resistance current path is broken before the line-jumper apparatus 20 reaches the open position.

Figure 15:
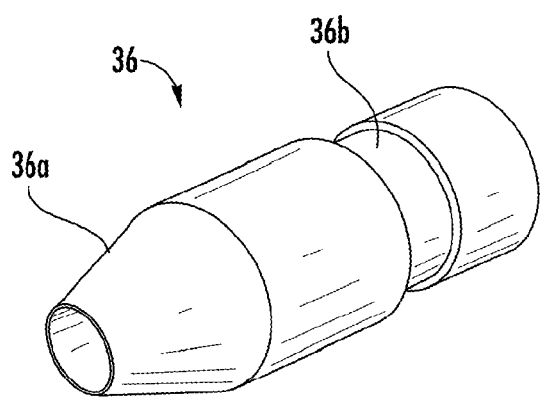
FIG. 15 schematically depicts a perspective view of an exemplary fixture.
Figure 16:
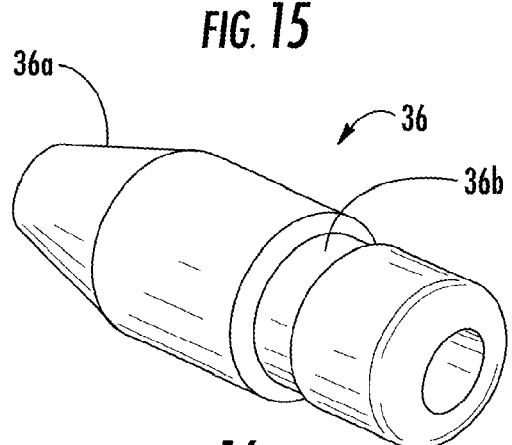
FIG. 16 schematically depicts another perspective view of an exemplary fixture.
Figure 17:
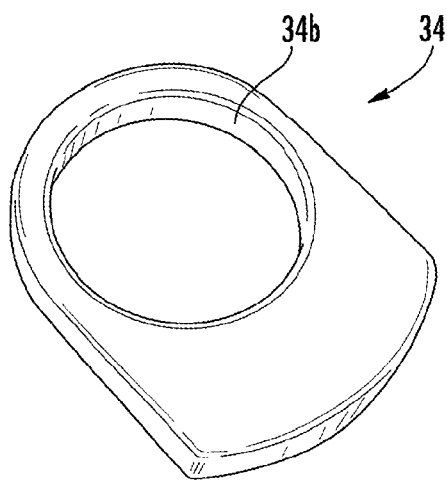
FIG. 17 schematically depicts a perspective of an exemplary key.
Figure 18:
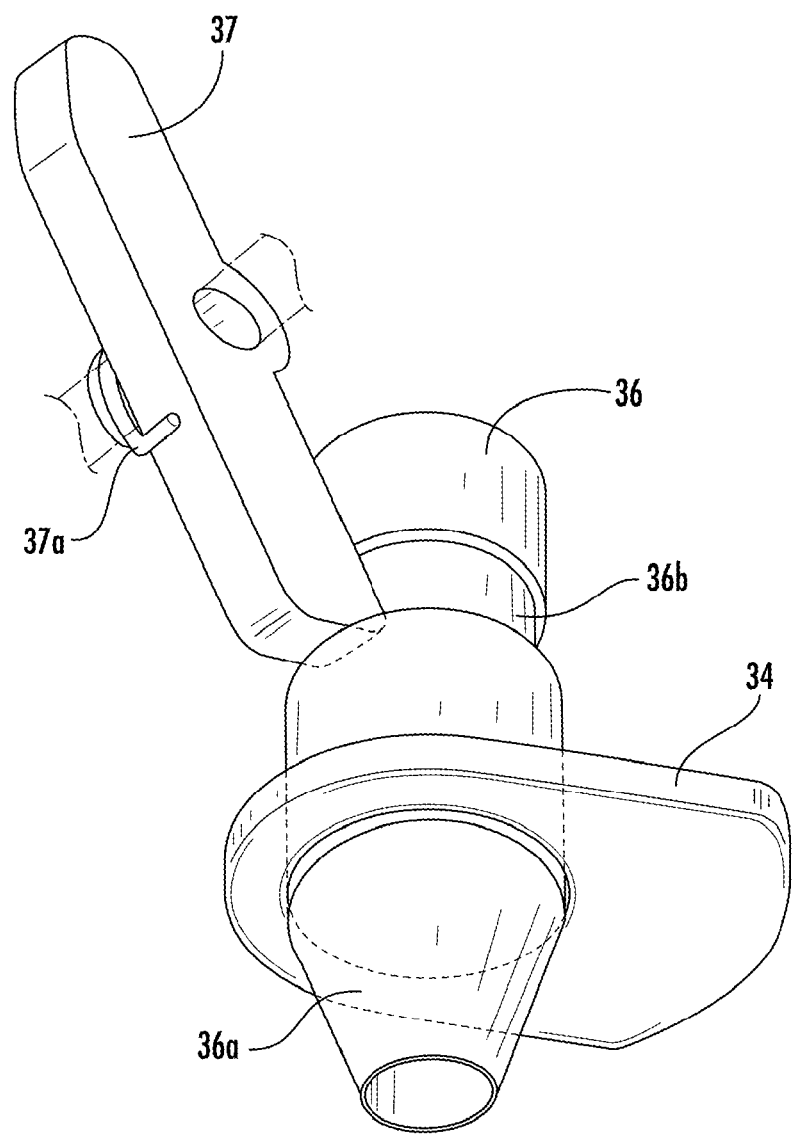
FIG. 18 schematically depicts a perspective view of an exemplary fixture being engaged by a toggle.

To provide a high-resistance current path, the line-jumper apparatus 20 typically includes a retractable contact assembly 35. As depicted in FIGS. 7 and 10-13, the retractable contact assembly 35 typically includes a fixture 36, an assembly rod 38, an assembly contact 39, and an assembly plug 41. As depicted in FIGS. 15-16 and 18, the fixture 36 typically includes a recess 36b that is engageable by the toggle 37. The lower end of the fixture 36 typically has a cone-like shape, thereby forming a ramp 36a. As depicted in FIGS. 17-18, the key 34 typically includes a fixture opening 34b, which enables the key 34 to surround a portion of the fixture 36.

As depicted in FIGS. 11-14, the retractable contact assembly 35 is typically connected to the inner housing 25 via one or more springs 31a, 31b. The springs 31a, 31b are typically connected to a spring connector 32. The spring connector 32 typically is connected to a spring connector plug 33, which is attached to the inner housing 25.

The springs 31a, 31b, spring connector 32, spring connector plug 33, fixture 36, assembly rod 38, and assembly contact 39 are typically formed of one or more conductive materials. The assembly plug 41 is typically formed from an insulating material. In addition, the assembly plug 41 is typically formed of one or more arc-extinguishing materials (e.g., an ablative material).

In the closed position, the line-jumper apparatus 20 provides a closed high-resistance current path from the first connector 21 to the second connector 30. In this regard, the high-resistance current path typically flows from the first connector 21 through the inner housing 25 to the springs 31a, 31b (e.g., via the spring connector 32 and the spring connector plug 33), from the springs 31a, 31b through the fixture 36 and the assembly rod 38 to the assembly contact 39, from the assembly contact 39 through the interior contact 49 and the venting structure 55 to the pin 64, and, finally, from the pin 64 to the second connector 30. During the transition from the closed position to the open position, the low-resistance current path is typically broken once the assembly contact 39 no longer forms an electrical connection with the interior contact 49.

Figures 19, 20:
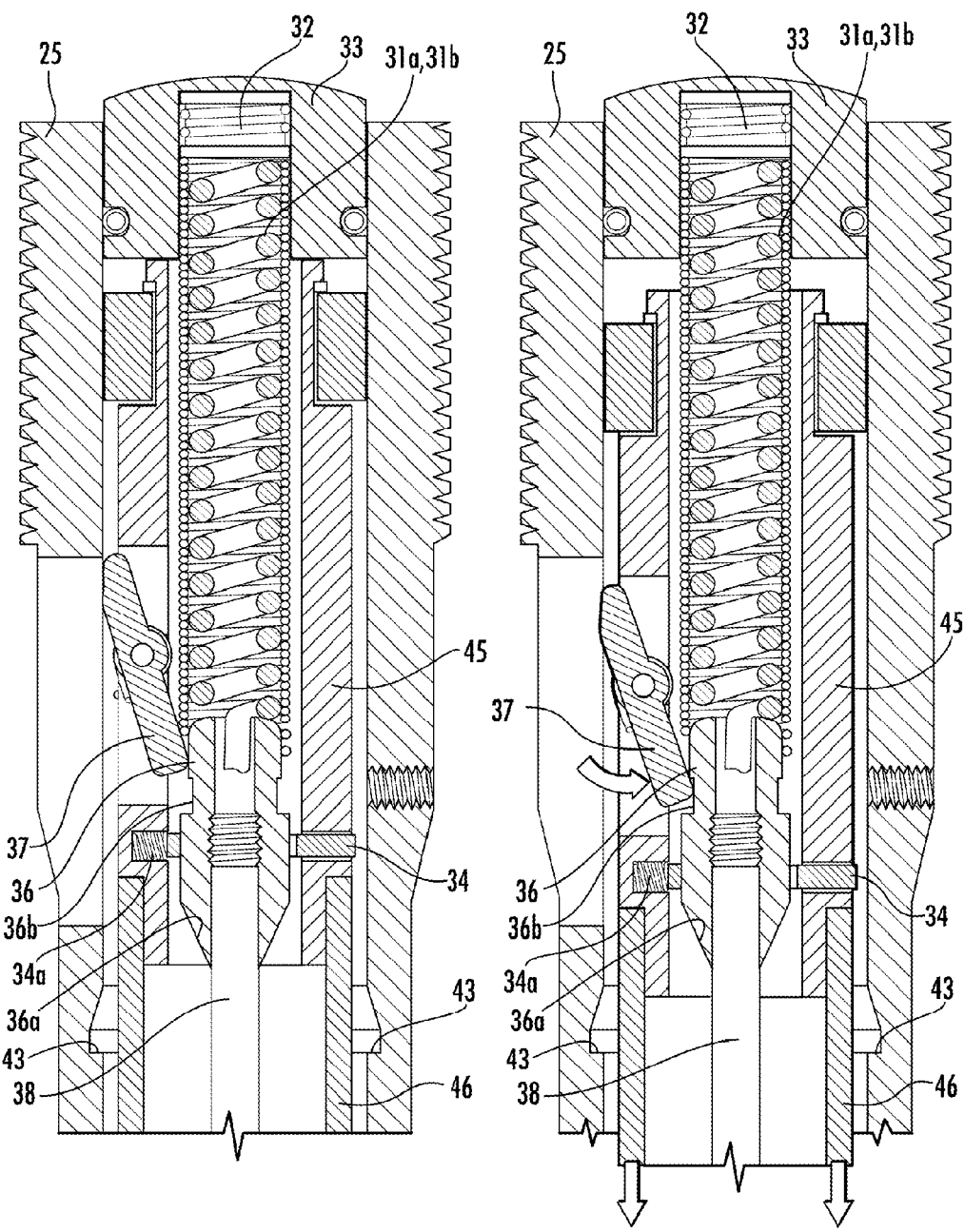

FIGS. 19-22 depict the operation of the toggle 37. As the line-jumper apparatus 20 is transitioned from the closed position to the open position, the intermediate assembly 40, including the toggle assembly 45, moves downward. As depicted in FIG. 20, once the toggle assembly 45 has moved sufficiently downward, the toggle 37 engages the fixture recess 36b, thereby causing the retractable contact assembly 35 to move in conjunction with the downward movement of the intermediate assembly 40. In this regard, the toggle 37 typically includes a toggle spring 37a that causes the toggle 37 to engage the fixture recess 36b. The engagement of the toggle 37 with the fixture recess 36b ensures that the retractable contact assembly 35 moves with the intermediate assembly 40, thereby maintaining a closed high-resistance current path during the transition from the closed position to the open position, even after the low-resistance current path is broken. As depicted in FIG. 9A, the engagement of the toggle 37 with the fixture recess 36b typically ensures that the electrical connection is maintained between the assembly contact 39 and the interior contact 49.

During the transition from the closed position to the open position, and immediately before the trigger plug 73 engages the locking structure 61 to lock the line-jumper apparatus 20 into the open position, the top portion of the toggle 37 typically comes into contact with a sleeve 42 that is positioned within the inner housing 25. Contact with the sleeve 42 causes the toggle 37 to unseat from the fixture recess 36b. Once the toggle 37 no longer engages the fixture recess 36b, the force of the springs 31a, 31b causes the retractable contact assembly 35 to retract within the inner housing 25. Once the retractable contact assembly 35 has retracted, the assembly contact 39 is no longer in contact with the interior contact 49, thereby breaking their electrical connection. Once the electrical connection between the assembly contact 39 and the interior contact 49 is broken, the high-resistance current path is broken. Once the high-resistance current path is broken, electric arcing occurs within the line-jumper apparatus 20 and hot gases caused by the electric arcing escape out of the vents 60.

The present line-jumper apparatus 20 typically includes a safety mechanism that prevents the low-resistance current path from being broken (e.g., opened) unless the high-resistance current path is closed. To provide this safety mechanism, the toggle assembly 45 typically includes the key 34. If the toggle 37 is not in a position allowing it to engage the fixture recess 36b (e.g., as depicted in FIG. 10), the key 34 prevents the intermediate assembly 40 from being sufficiently extended in a way that breaks the low-resistance current path (e.g., by breaking the connection between the inner-housing contact rings 28 and the intermediate contact 50).

Figure 23:
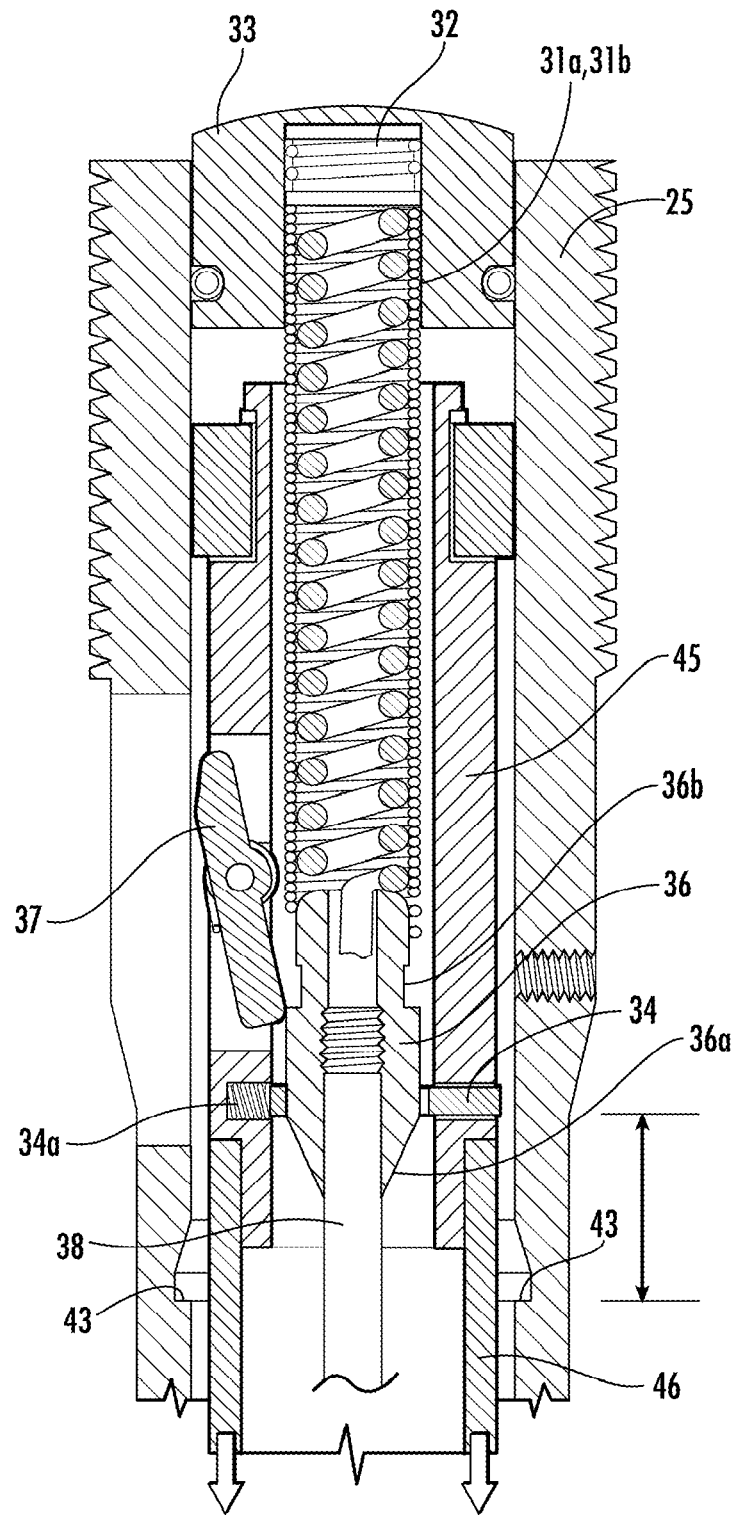
FIGS. 23-26 schematically depict the operation of an exemplary key if the toggle is not positioned to engage a fixture.
Figures 24, 25:
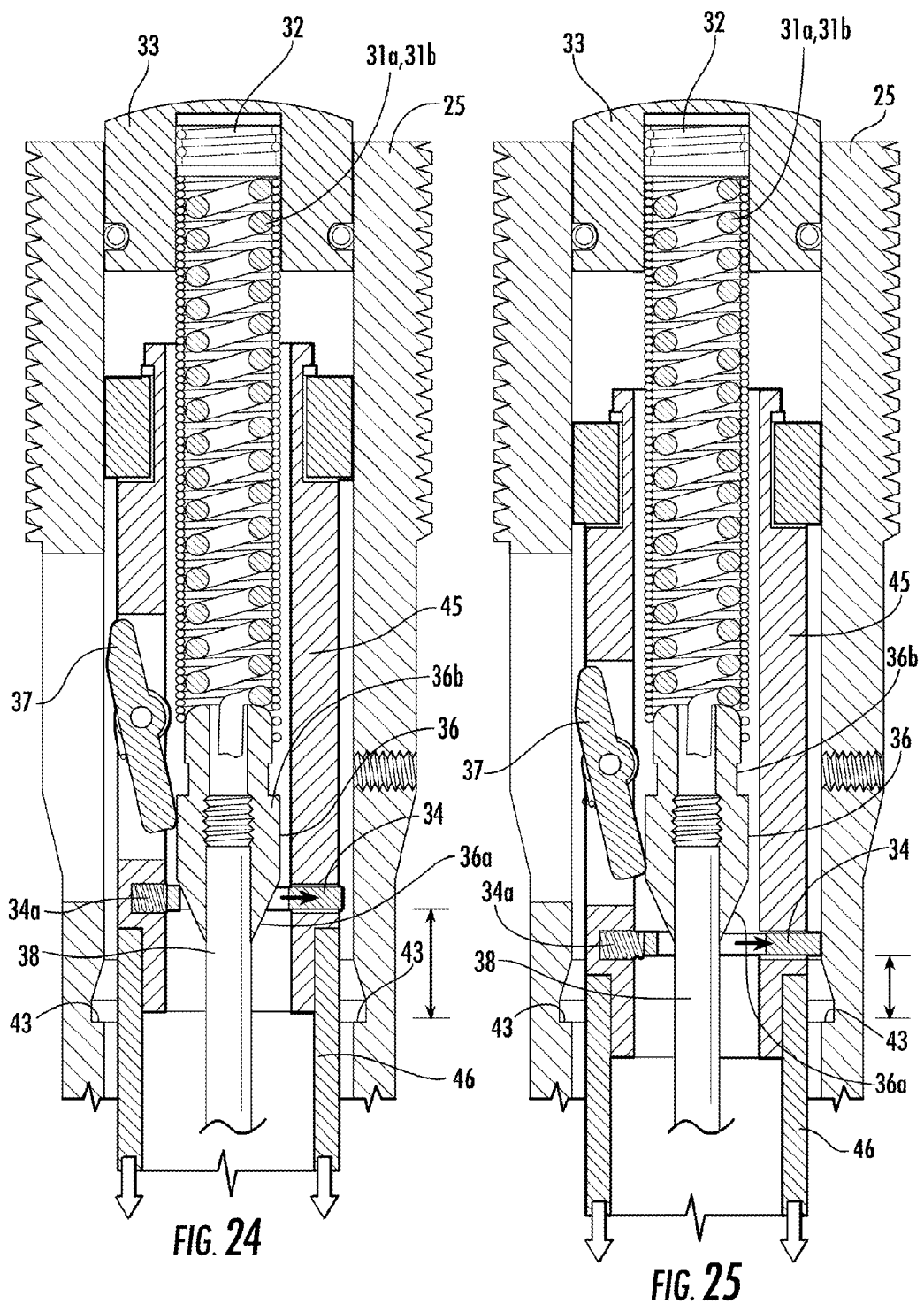
Figure 26:
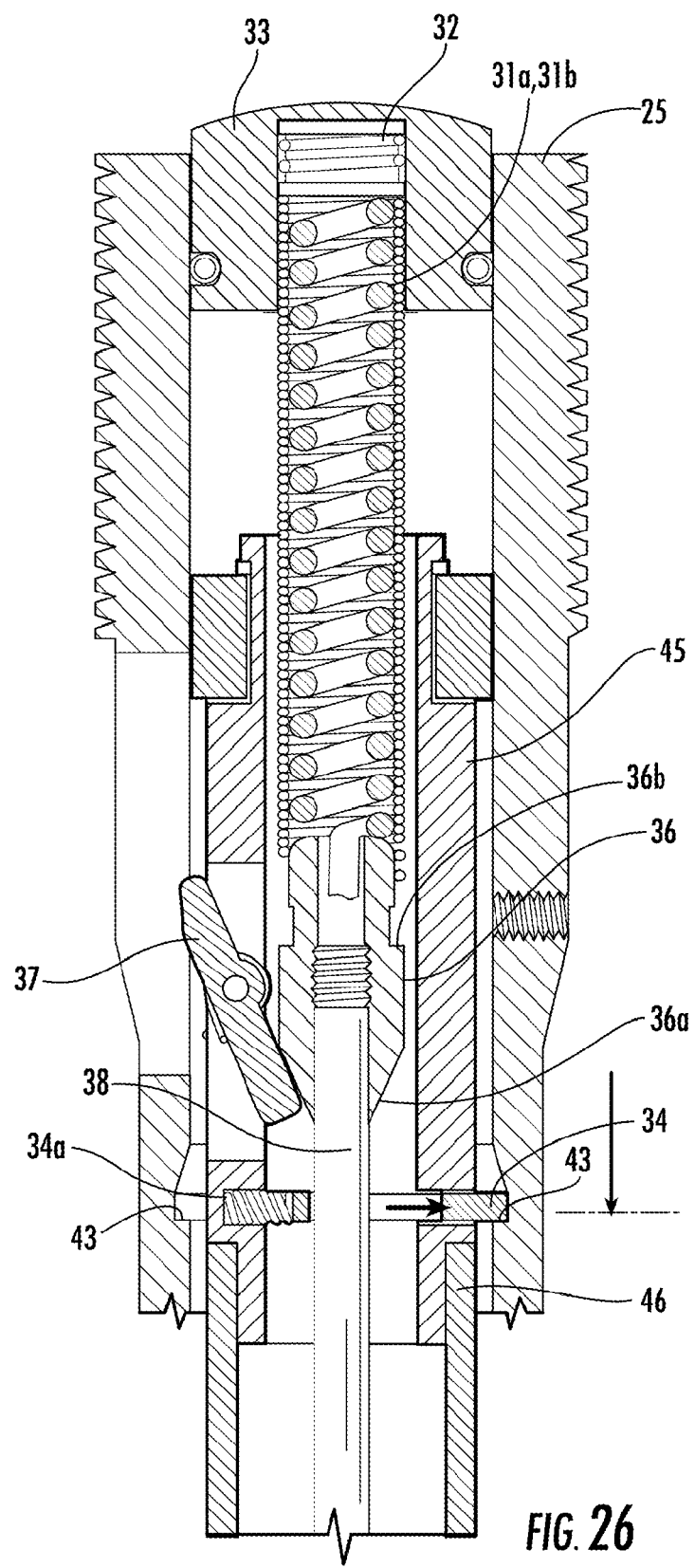

This safety feature is depicted in more detail in FIGS. 23-26. FIG. 23 depicts the toggle assembly 45 being positioned too far down relative to the fixture 36 so that the toggle 37 cannot engage the fixture recess 36b. This improper positioning of the toggle assembly 45 may occur if the intermediate assembly 40 is not fully retracted within the line-jumper apparatus 20 after the reset trigger 66 has been engaged to return the line-jumper apparatus 20 to the closed position. As shown in FIGS. 24-25, as the toggle assembly 45 moves downward relative to the fixture 36, the fixture ramp 36a allows a key spring 34a to push the key 34 so that a portion of the key 34 extends out of the exterior of the toggle assembly 45. As depicted in FIG. 26, the key spring 34a continues to push the key 34 so that the key 34 is sufficiently extended to engage the inner groove 43. The engagement of the key 34 with the inner groove 43 prevents the intermediate assembly 40 from being further extended downward out of the bottom of the line-jumper apparatus 20. As depicted in FIG. 10, the inner groove 43 is typically positioned within the inner housing 25 so that, if the toggle 37 is not in a position allowing it to engage the fixture recess 36b, the engagement of the key 34 with the inner groove 43 prevents the intermediate assembly 40 from being sufficiently extended in a way that breaks the electrical connection between the inner housing 25 (e.g., via the inner-housing contact rings 28) and the intermediate contact 50.

As depicted in FIGS. 20-22, if the toggle assembly 45 is properly positioned so that the toggle 37 can engage the fixture recess 36b, the fixture 36 prevents the key 34 from sufficiently extending out of the exterior of the toggle assembly 45 in a way that engages the inner groove 43.

In an alternative embodiment, the toggle may be eliminated. In this regard, FIGS. 36-46 depict a line-jumper apparatus 20 in which the toggle has been eliminated.

Figure 36:
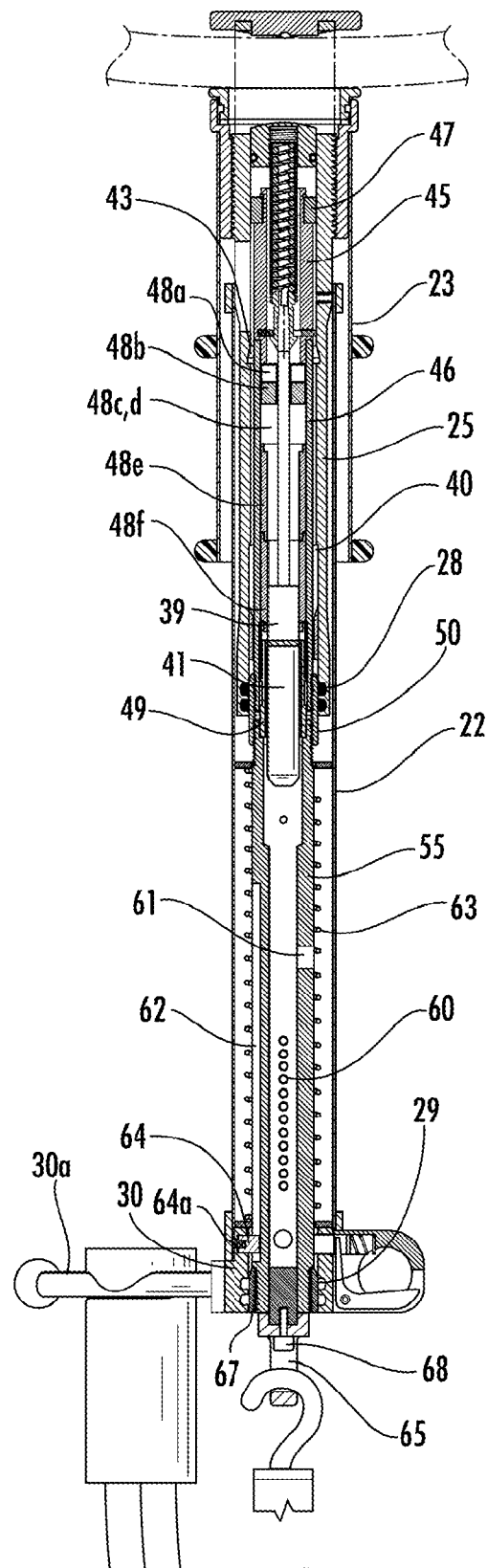
Figure 39:
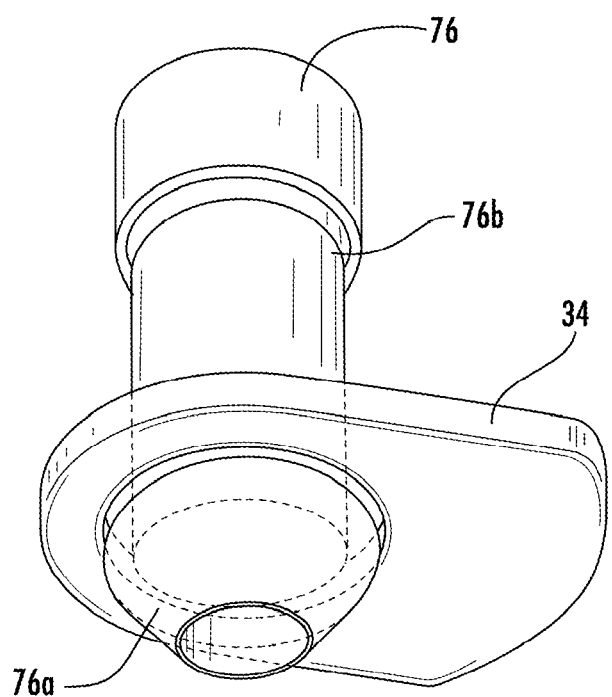
FIG. 39 schematically depicts a perspective view of an alternative fixture design.

As depicted in FIGS. 36-38, the toggle assembly 45 may be replaced with a key assembly 45 (e.g., an engaging assembly) that includes a key 34. Furthermore, the retractable contact assembly 35 includes a fixture 76 having an alternative design. As depicted in FIG. 39, the fixture 76 includes a wedge portion 76a and a large-diameter portion 76b. The wedge portion 76a typically has a maximum diameter that is slightly less than the internal diameter of the key's fixture opening 34b.

Figures 40, 41:
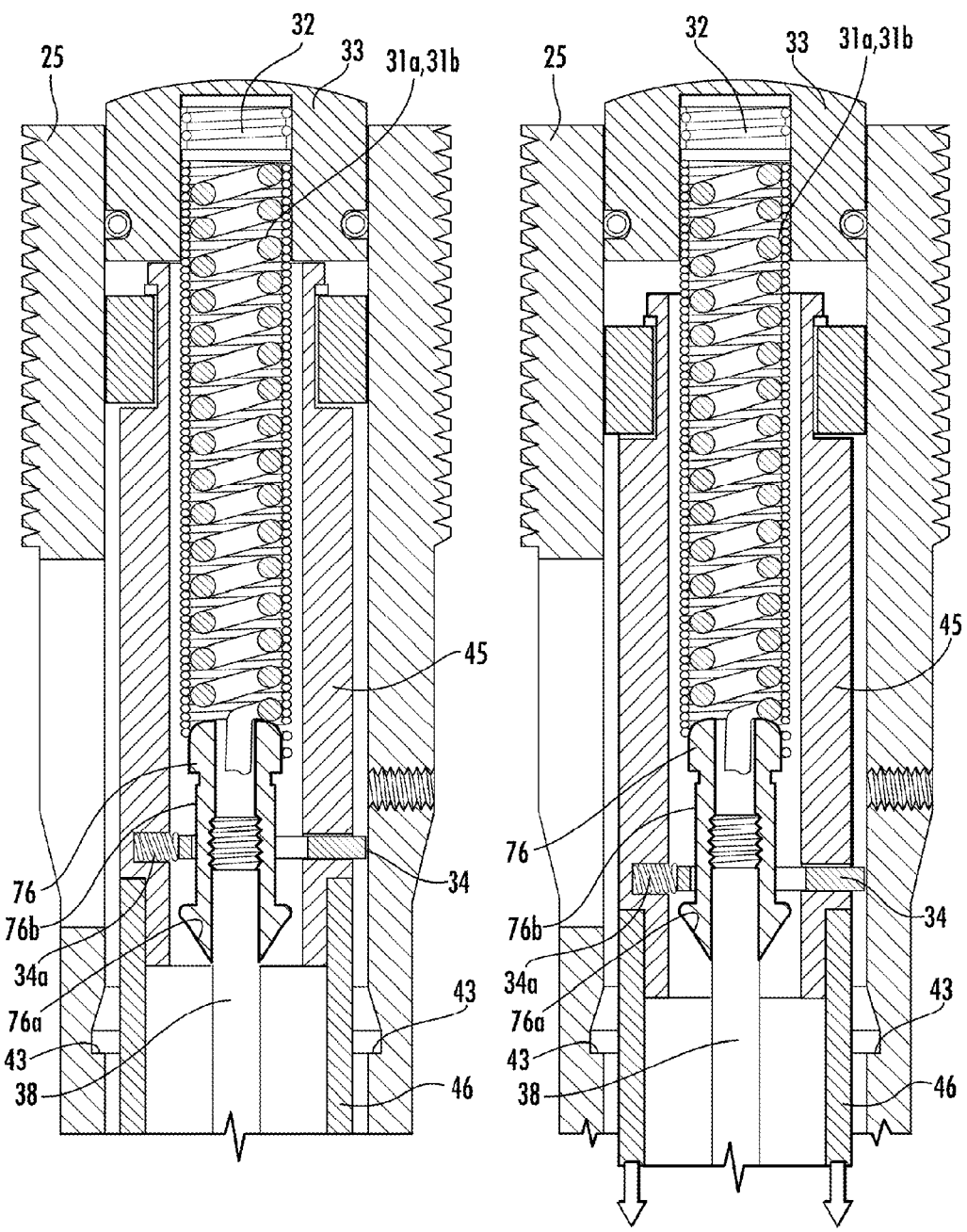
FIGS. 40-43 schematically depict a key engaging an exemplary fixture to effect the extension of a retractable contact assembly.
Figures 42, 43:
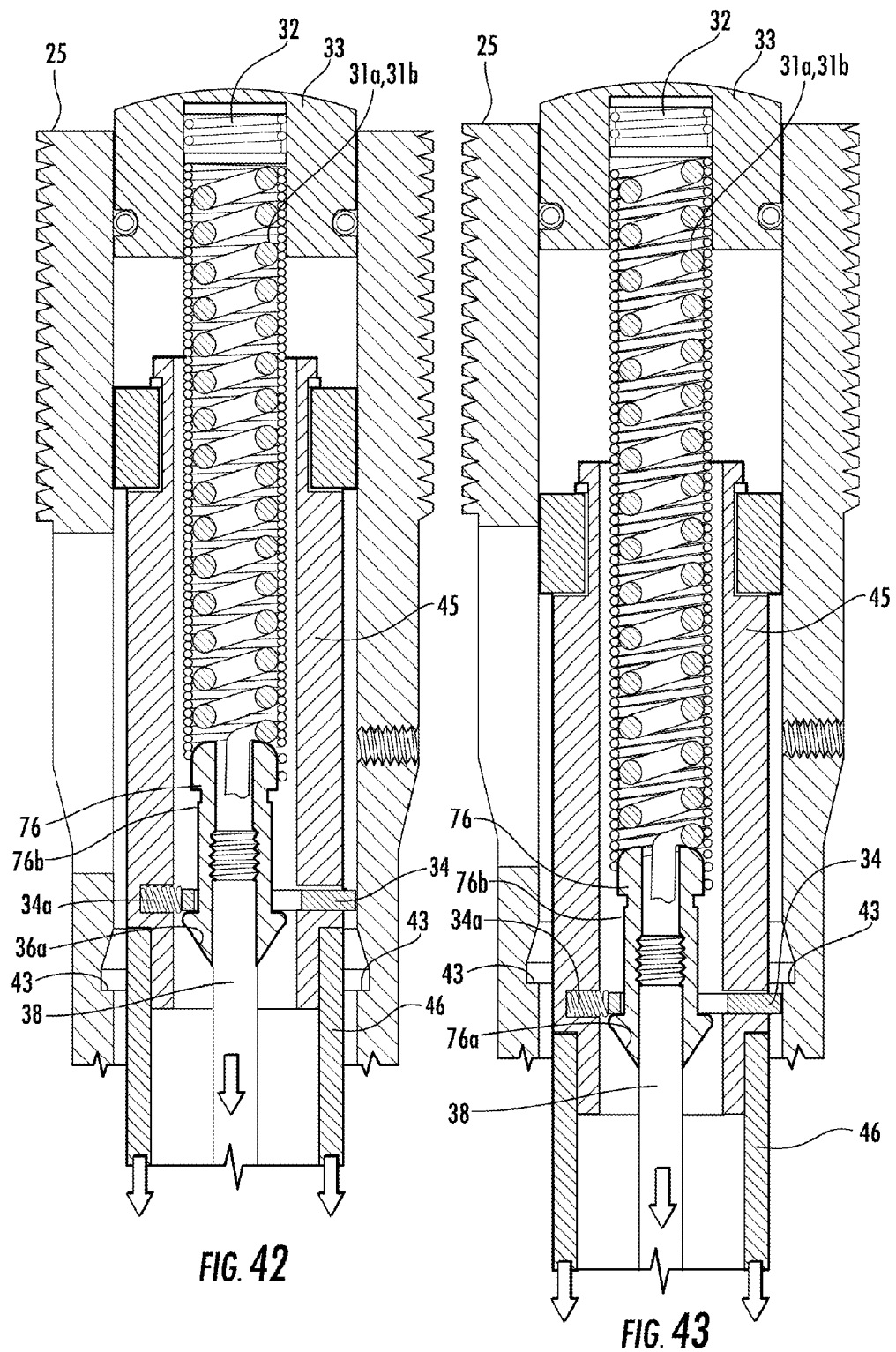

FIGS. 40-43 depict the operation of the key assembly 45 during the transition from the closed position to the open position if the key assembly 45 is properly positioned relative to the retractable contact assembly 35. As depicted in FIGS. 40-42, once the key assembly 45 has moved sufficiently downward, the key spring 34a pushes the key 34 so it engages the top portion of the wedge 76a, thereby causing the retractable contact assembly to move in conjunction with the downward movement of the intermediate assembly 40. As depicted in FIGS. 42-43, although the key 34 partially protrudes (e.g., extends) from the key assembly 45, the large-diameter portion 76b prevents the key 34 from sufficiently extending out of the exterior of the key assembly 45 in a way that engages the inner grove 43, when the key 34 engages the top portion of the wedge 76a. The engagement of the key 34 with the fixture 76 ensures that the retractable contact assembly 35 moves with the intermediate assembly 40, thereby maintaining a closed high-resistance current path during the transition from the closed position to the open position, even after the low-resistance current path is broken. As depicted in FIG. 37, the engagement of the key 34 with the fixture 76 typically ensures that the electrical connection is maintained between the assembly contact 39 and the interior contact 49.

During the transition from the closed position to the open position, and immediately before the trigger plug 73 engages the locking structure 61 to lock the line-jumper apparatus 20 into the open position, the protruding portion of the key 34 typically comes into contact with a sleeve 42 that is positioned within the inner housing 25. Contact with the sleeve 42 causes the key 34 to sufficiently depress so that the key opening 34b is aligned with the fixture 76. As depicted in FIG. 38, once the key opening 34b is aligned with the fixture 76, the retractable contact assembly 35 will automatically retract within the inner housing 25 (e.g., due to the force of the springs 31a, 31b). Once the retractable contact assembly 35 has retracted, the assembly contact 39 is no longer in contact with the interior contact 49, thereby breaking their electrical connection. Once the electrical connection between the assembly contact 39 and the interior contact 49 is broken, the high-resistance current path is broken. Once the high-resistance current path is broken, electric arcing occurs within the line-jumper apparatus 20, and hot gases caused by the electric arcing escape out of the vents 60.

Figures 44, 45:
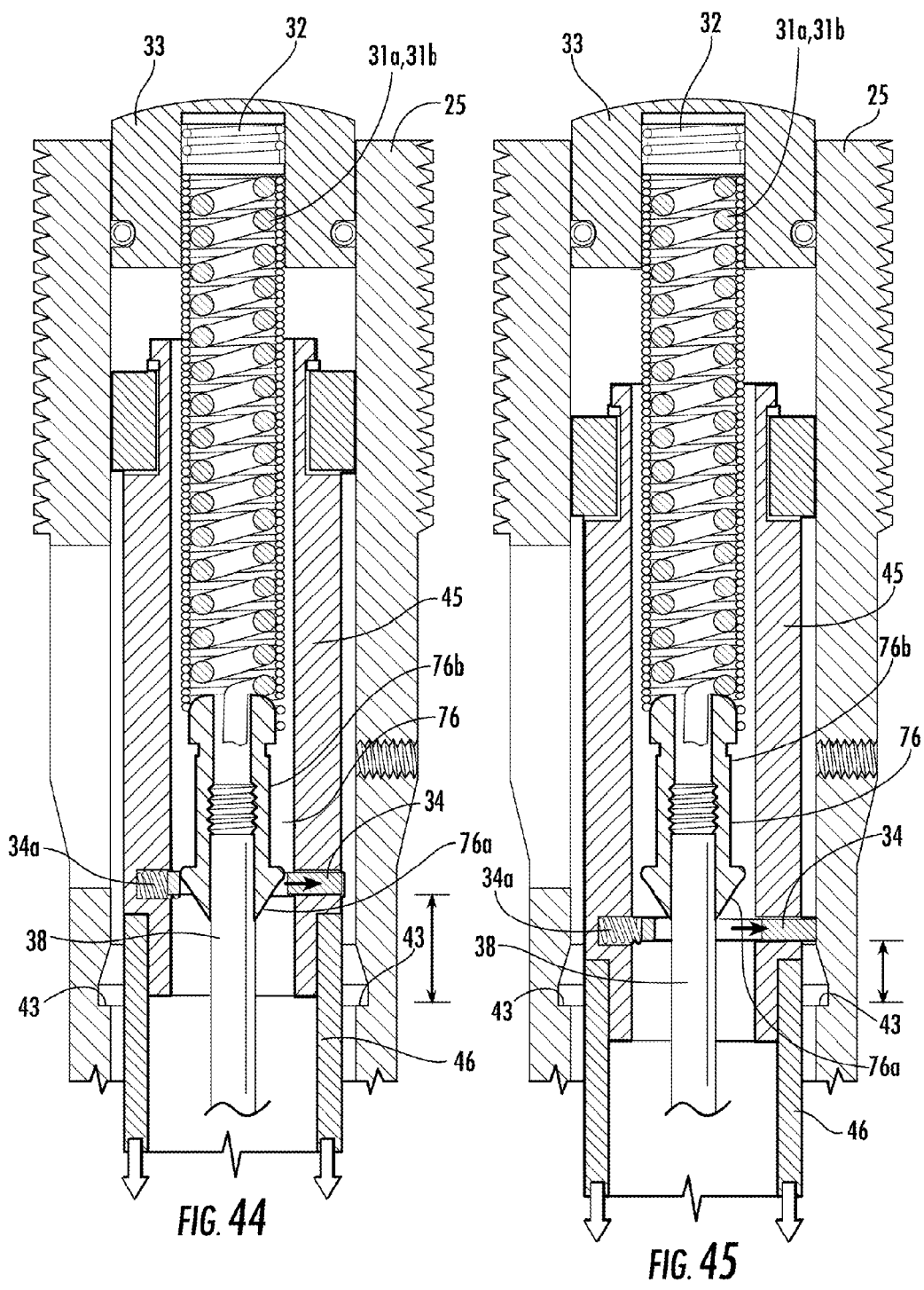
FIGS. 44-46 schematically depict the operation of an exemplary key if the key is not positioned to engage a fixture.
Figure 46:
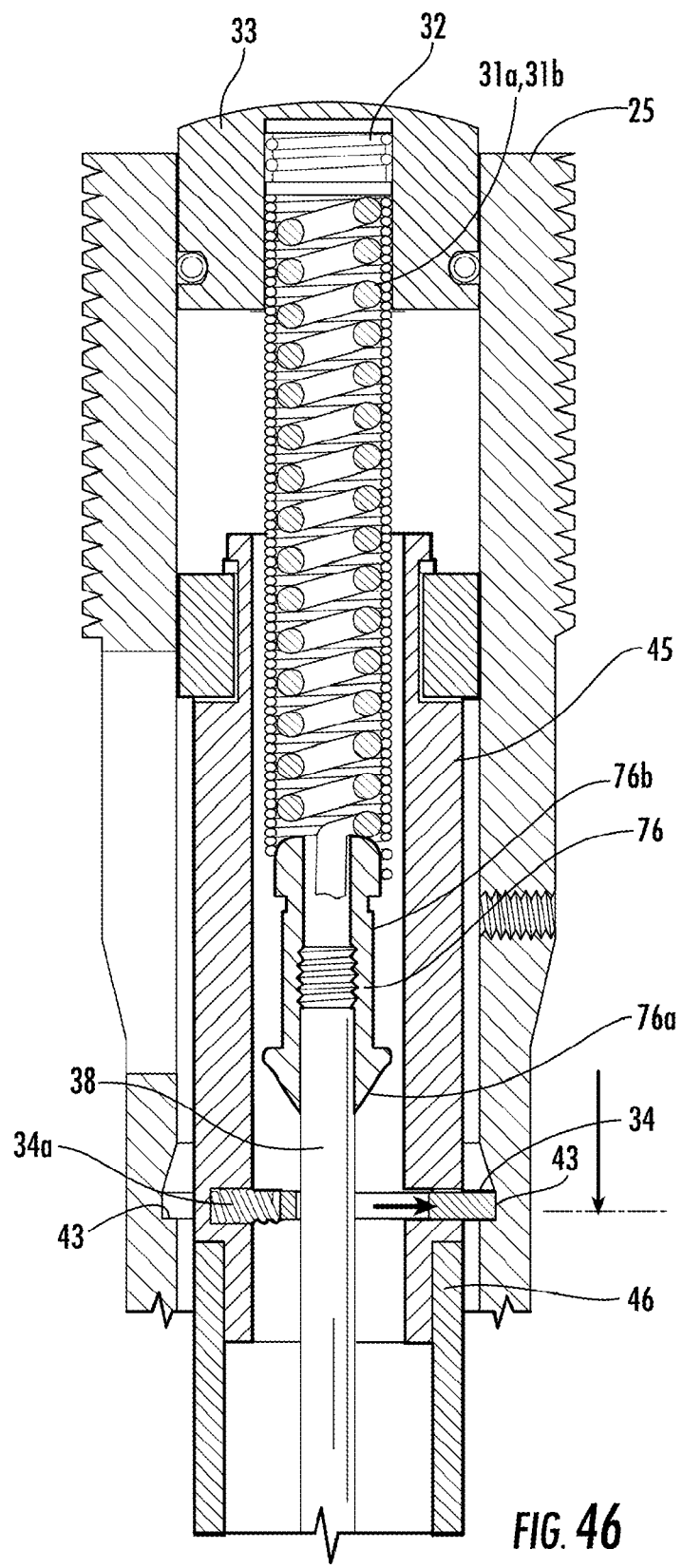

FIGS. 44-46 depict the key 34 being used as a safety feature. FIG. 44 depicts the key assembly 45 being positioned too far down relative to the fixture 76 so that the key 34 cannot engage the top portion of the wedge 76a. This improper positioning of the key assembly 45 may occur if the intermediate assembly 40 is not fully retracted within the line-jumper apparatus 20 after the reset trigger 66 has been engaged to return the line-jumper apparatus 20 to the closed position. As shown in FIGS. 44-46, as the key assembly 45 moves downward relative to the fixture 76, the ramp portion of the wedge 76b allows the key spring 34a to push the key 34 so that a portion of the key 34 extends out of the exterior of the key assembly 45. As depicted in FIG. 46, the key spring 34a continues to push the key 34 so that the key 34 is sufficiently extended to engage the inner groove 43. The engagement of the key 34 with the inner groove 43 prevents the intermediate assembly 40 from being further extended downward out of the bottom of the line-jumper apparatus 20. The inner groove 43 is typically positioned within the inner housing 25 so that, if the key 34 is not in a position allowing it to engage the top of the wedge 76b, the engagement of the key 34 with the inner groove 43 prevents the intermediate assembly 40 from being sufficiently extended in a way that breaks the electrical connection between the inner housing 25 (e.g., via the inner-housing contact rings 28) and the intermediate contact 50.

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A line jumper apparatus, comprising:
a housing including an intermediate assembly movably positioned therein,
a first connector attached to the housing;
a second connector attached to the housing; and
said apparatus being capable of being transitioned between a closed position and an open position, said apparatus in the closed position providing a low-resistance current path and a high-resistance current path between said first connector and said second connector through said intermediate assembly, said apparatus in the open position inhibiting current from flowing between said first connector and said second connector, and said apparatus being configured so that, when said apparatus is transitioned from the closed position to the open position, said low-resistance current path is opened before said high-resistance current path is opened;
wherein said apparatus comprises a safety key mechanism, said safety key mechanism configured to: (1) prevent the intermediate assembly from being sufficiently extended in a way that breaks the low resistance current path, thereby preventing said low-resistance current path from being opened when said high-resistance current path is open, and (2) permit the intermediate assembly to be extended in a way that breaks the low resistance current path when said high-resistance current path is closed.

2. A line jumper apparatus according to claim 1, comprising a closed-position locking structure for locking said apparatus in the closed position.

3. A line jumper apparatus according to claim 1, comprising an open-position locking structure for locking said apparatus in the open position.

4. A line jumper apparatus according to claim 3, wherein, when said apparatus is transitioned from the closed position to the open position, said open-position locking structure automatically locks said apparatus in the open position after said high-resistance current path is opened.

5. A line jumper apparatus according to claim 3, comprising a reset trigger in communication with said open-position locking structure, wherein, as a result of engaging said reset trigger when said apparatus is in the open position, (i) said open-position locking structure disengages, and (ii) said apparatus automatically returns to the closed position.

6. A line jumper apparatus according to claim 1, wherein said housing comprises:
an outer housing;
an inner housing positioned within said outer housing;
a retractable contact assembly movably positioned within said housing and within at least a portion of said intermediate assembly; and
wherein the portion of said intermediate assembly extends out of said housing when the apparatus is in the open position.

7. A line jumper apparatus according to claim 6, wherein:
when said apparatus is in the closed position, said low-resistance current path extends from said first connector to said inner housing, said inner housing to said intermediate assembly, and said intermediate assembly to said second connector;
when said apparatus is in the closed position, said high-resistance current path extends from said first connector to said inner housing, said inner housing to said retractable contact assembly, said retractable contact assembly to said intermediate assembly, and said intermediate assembly to said second connector;
when said apparatus is in the open position, said inner housing is not in electrical communication with a conductive portion of said intermediate assembly, thereby opening said low-resistance current path; and
when said apparatus is in the open position, said intermediate assembly is not in electrical communication with a conductive portion of said retractable contact assembly, thereby opening said high-resistance current path.

8. A line jumper apparatus according to claim 7, wherein:
said intermediate assembly comprises an engaging assembly for engaging said retractable contact assembly; and
when said engaging assembly is engaged with said retractable contact assembly, said intermediate assembly remains in electrical communication with said retractable contact assembly in a way that said high-resistance current path remains closed.

9. A line jumper apparatus according to claim 8, wherein:
when said apparatus is transitioned from the closed position to the open position, said engaging assembly engages then releases said retractable contact assembly, said engaging assembly releasing said retractable contact assembly after said low-resistance current path has opened by said inner housing not being in electrical communication with a conductive portion of said intermediate assembly;

said retractable contact assembly is configured to automatically move within said housing, upon being released by said engaging assembly, so that said intermediate assembly is not in electrical communication with a conductive portion of said retractable contact assembly.

10. A line jumper apparatus according to claim 9, wherein said safety key mechanism is in communication with said intermediate assembly and said retractable contact assembly, said safety key mechanism being configured to prevent said intermediate assembly from moving within said housing in a way that would allow said low-resistance current path to open after said high-resistance current path has opened.

11. A line jumper apparatus according to claim 10, wherein said safety key mechanism is configured to prevent said intermediate assembly from moving within said housing in a way that would allow said low-resistance current path to open unless said engaging assembly is engaged with said retractable contact assembly.

12. A line jumper apparatus according to claim 10, comprising an open-position locking structure for locking said apparatus in the open position, wherein, when said apparatus is transitioned from the closed position to the open position, said open-position locking structure is configured to automatically lock said apparatus in the open position after said engaging assembly has released said retractable contact assembly.

13. A line jumper apparatus according to claim 12, comprising a reset trigger configured to be engageable with said open-position locking structure, wherein, when said apparatus is in the open position, as a result of engaging said reset trigger (i) said open-position locking structure disengages and (ii) said apparatus automatically returns to the closed position.

14. A line jumper apparatus according to claim 10, wherein said intermediate assembly comprises a venting structure, said venting structure comprising vents for allowing gases to escape said housing, said vents extending out of said housing when said apparatus is in the open position.

15. A line jumper apparatus, comprising:
a first connector;
a second connector; and
a housing attached to said first connector and said second connector, said apparatus being capable of transitioning between a closed position and an open position, said housing comprising:
an outer housing;
an inner housing;
an intermediate assembly movably positioned within said housing, said intermediate assembly comprising (i) an engaging assembly, (ii) a nonconductive portion, and (iii) a venting structure having vents;
a retractable contact assembly movably positioned within said housing and within at least a portion of said intermediate assembly, said retractable contact assembly being engageable by said engaging assembly; and
a safety key in communication with said intermediate assembly and said retractable contact assembly;
wherein, when said apparatus is in the closed position, a low-resistance current path extends from said first connector to said inner housing, said inner housing to said intermediate assembly, and said intermediate assembly to said second connector;
wherein, when said apparatus is in the closed position, a high-resistance current path extends from said first connector to said inner housing, said inner housing to said retractable contact assembly, said retractable contact assembly to said intermediate assembly, and said intermediate assembly to said second connector;

wherein, when said apparatus is in the open position, said low-resistance current path and said high-resistance current path are open, thereby inhibiting current from flowing between said first connector and said second connector;

wherein said housing is configured so that, when said engaging assembly is engaged with said retractable contact assembly, said intermediate assembly remains in electrical communication with said retractable contact assembly in a way that said high-resistance current path remains closed;

wherein, when said apparatus is transitioned from the closed position to the open position, said engaging assembly engages then releases said retractable contact assembly, said engaging assembly releasing said retractable contact assembly after said low-resistance current path has opened, said retractable contact assembly, upon being released by said engaging assembly, automatically retracting within said housing so that said intermediate assembly is not in electrical communication with a conductive portion of said retractable contact assembly; and wherein said safety key is configured to prevent said intermediate assembly from moving within said housing in a way that would allow said low-resistance current path to open unless said engaging assembly is engaged with said retractable contact assembly.

16. A line jumper apparatus according to claim 15, comprising:
an open-position locking structure; and
a reset trigger, said reset trigger being configured, when said apparatus is transitioned from the closed position to the open position, to automatically engage said open-position locking structure to lock said apparatus in the open position after said engaging assembly has released said retractable contact assembly;
wherein, when said apparatus is in the open position, engaging said reset trigger disengages said open-position locking structure.

17. A line jumper apparatus according to claim 16, wherein said outer housing encloses a reset spring for automatically returning said apparatus to the closed position after said reset trigger disengages said open-position locking structure.

18. A line jumper apparatus according to claim 15, wherein said engaging assembly comprises a toggle for engaging said retractable contact assembly.

19. A line jumper apparatus according to claim 15, wherein:
said safety key is connected to said engaging assembly and is configured to engage said retractable contact assembly; and
when said apparatus is transitioned from the closed position to the open position, said safety key engages then releases said retractable contact assembly, said safety key releasing said retractable contact assembly after said low-resistance current path has opened, said retractable contact assembly, upon being released by said safety key, automatically retracting within said housing so that said intermediate assembly is not in electrical communication with a conductive portion of said retractable contact assembly.

20. A line jumper apparatus according to claim 15, wherein, when said apparatus is in the open position, said inner housing is in contact with said nonconductive portion of said intermediate assembly, thereby opening said low resistance current path.

21. A line jumper apparatus according to claim 15, wherein said vents extend out of said housing when said apparatus is in the open position.

22. A line jumper apparatus according to claim 15, wherein said retractable contact assembly comprises one or more springs for connecting said retracting contact assembly to said inner housing and for automatically retracting said retractable contact assembly within said housing when said engaging assembly releases said retractable contact assembly.

23. A line jumper apparatus, comprising:
a housing including an intermediate assembly movably positioned therein,
a first connector attached to the housing;
a second connector attached to the housing; and
said housing defining a primary axis between said first connector and said second connector, said apparatus being capable of transitioning between a closed position and an open position, said apparatus in the closed position providing a low-resistance current path and a high-resistance current path between said first connector and said second connector, said apparatus in the open position inhibiting current from flowing between said first connector and said second connector, and said apparatus being configured so that, when said apparatus is transitioned from the closed position to the open position, said low-resistance current path is opened before said high-resistance current path is opened;
wherein said housing comprises a venting structure having vents for allowing gases to escape said housing;
wherein, when said apparatus is in the open position, said vents are configured to (i) extend out of said housing and (ii) release hot gases that occur during electric arcing primarily in one or more directions substantially perpendicular to said primary axis;
wherein said apparatus comprises a safety key mechanism, said safety key mechanism configured to: (1) prevent the intermediate assembly from being sufficiently extended in a way that breaks the low resistance current path, thereby preventing said low-resistance current path from being opened when said high-resistance current path is open, and (2) permit the intermediate assembly to be extended in a way that breaks the low resistance current path when said high-resistance current path is closed.

24. A line jumper apparatus, comprising:
a housing including an intermediate assembly movably positioned therein,
a first connector attached to the housing;
a second connector attached to the housing and defining a cavity therethrough, said second connector comprising an internal pin connector that protrudes into said cavity; and
said apparatus being capable of transitioning between a closed position and an open position, said apparatus in the closed position providing a low-resistance current path and a high-resistance current path between said first connector and said second connector, said apparatus in the open position inhibiting current from flowing between said first connector and said second connector, and said apparatus being configured so that, when said apparatus is transitioned from the closed position to the open position, said low-resistance current path is opened before said high-resistance current path is opened;

wherein said housing comprises a venting structure configured to (i) slidably engage said second connector's cavity and (ii) at least partially extend out of said second connector when said apparatus is in the open position, said venting structure comprising (i) vents for allowing gases to escape said housing when the apparatus is in the open position and (ii) a guide rail;

wherein said apparatus comprises a safety key mechanism, said safety key mechanism configured to: (1) prevent the intermediate assembly from being sufficiently extended in a way that breaks the low resistance current path, thereby preventing said low-resistance current path from being opened when said high-resistance current path is open, and (2) permit the intermediate assembly to be extended in a way that breaks the low resistance current path when said high-resistance current path is closed;

wherein said internal pin connector, when said apparatus is transitioned from the closed position to the open position, is configured to slidably engage said guide rail to (i) prevent the rotation of said venting structure and (ii) maintain an electrical connection between said housing and said second connector.

25. A line jumper apparatus according to claim 24, comprising:

an open-position locking structure; and a reset trigger, said reset trigger being configured, when said apparatus is transitioned from the closed position to the open position, to automatically engage said open-position locking structure to lock said apparatus in the open position after said high-resistance current path has opened;

wherein said housing comprises a reset spring positioned around said venting structure for automatically returning said apparatus to the closed position after said reset trigger disengages said open-position locking structure.

26. A line jumper apparatus according to claim 25, wherein said second connector comprises one or more canted coil springs positioned along the circumference of said second connector's cavity, said canted coil springs maintaining an electrical connection between said housing and said second connector when said apparatus is in the closed position.

27. A line jumper apparatus according to claim 26, wherein said reset spring has a spring constant of less than about 1.0 pound per inch of compression.

28. A line jumper apparatus according to claim 26, wherein said reset spring has a spring constant of no more than about 0.65 pound per inch of compression.

* * * * *